United States Patent [19]

Sinha et al.

[11] Patent Number: 5,014,230

[45] Date of Patent: May 7, 1991

[54] SOLID-MODELING SYSTEM USING TOPOLOGY DIRECTED SUBDIVISION FOR DETERMINATION OF SURFACE INTERSECTIONS

[75] Inventors: Pradeep Sinha; Turhan F. Rahman, both of Ithaca, N.Y.

[73] Assignee: XOX Corporation, Apple Valley, Minn.

[21] Appl. No.: 455,500

[22] Filed: Dec. 22, 1989

Related U.S. Application Data

[60] Division of Ser. No. 308,975, Feb. 9, 1989, Pat. No. 4,890,242, which is a continuation of Ser. No. 871,091, Jun. 6, 1986, abandoned.

[51] Int. Cl.$^5$ .................. G06F 15/16; G06F 15/72
[52] U.S. Cl. .................. 364/578; 364/132; 364/200; 364/226.7; 364/900; 364/942.7
[58] Field of Search ............ 364/132, 200, 578, 900, 364/518, 521

[56] References Cited

U.S. PATENT DOCUMENTS

| | | | |
|---|---|---|---|
| 4,347,564 | 8/1982 | Sugano et al. | 364/132 |
| 4,459,655 | 7/1984 | Willemin | 364/132 |
| 4,700,292 | 10/1987 | Campanini | 364/200 |

FOREIGN PATENT DOCUMENTS

| | | | |
|---|---|---|---|
| 214011 | 9/1984 | German Democratic Rep. | 354/132 |

OTHER PUBLICATIONS

Björck, Ake, et al., "Numerical Methods for Computing Angles Between Subspaces", Mathematics of computation, vol. 27, No. 123, Jun. 1973, pp. 579-594.
Casale Malcolm, et al., "An Overview of Analytical Solid Modeling", IEEE C G & A, Feb. 1985, pp. 45-56.
Catmull, E., "A Subdivision Algorithm for Computer Display of Curved Surfaces", University of Utah Com. Sci. Dept. UTEC-CSC-74-133 (1974).
Cohen, Elaine, et al., "Discrete B-Splines and Subdivision Techniques in computer-Aided Geometric Design and Computer Graphics", Computer Graphics and Image Processing, vol. 14, 1980, pp. 87-111.
Comba, Paul, "A Procedure for Detecting Intersections of Three-Dimensional Objects", Journal of the ACM, vol. 15, Jul., 1968, pp. 354-366.
DeBoor, Carl, "On Calculating with B-Splines", Journal of Approximation Theory, vol. 6, 1972, pp. 50-62.
Farouki, Rida, et al., "A Hierarchy of Geometric Forms", IEEE CG & A, May, 1985, pp. 51-78.
Houghton, Elizabeth, et al., "Implementation of a Divide-and-Conquer Method for Intersection of Parametric Surfaces", computer Aided Geometric Design, vol. 2, 1985, pp. 173-183.
Lane, Jeffrey, et al., "A Generalized Scan Line Algorithm for the Computer Display of Parametrically Defined Surfaces", Computer Graphics and Image Processing, vol. 11, 1979, pp. 290-297.
Lane, Jeffrey, et al., "A Theoretical Development for the computer Generation and Display of Piecewise Polynomial Surfaces", Transactions on Pattern Analysis and Machine Intelligence, vol. PAMI-2, No. 1, Jan., 1980, pp. 35-46.

(List continued on next page.)

*Primary Examiner*—Felix D. Gruber
*Attorney, Agent, or Firm*—Merchant, Gould, Smith, Edell, Welter and Schmidt

[57] ABSTRACT

A system for topology directed subdivision of a pair of surfaces to identify intersecting portions thereof includes the steps of obtaining a pair of surfaces from a main pool of surface representations and performing a mutual point exclusion test to determine if the surfaces may have an intersection. For those pairs of surfaces possibly having an intersection, the transversality of the surface is checked. If transversal, the intersection set is computed. For those pairs which are not transversal, recursive subdivision is performed until transversality is established or until a flatness criteria is met. A parallel processing system including a master processor and a plurality of slave processors performs the subdivision operation on the surfaces in a parallel fashion.

1 Claim, 18 Drawing Sheets

OTHER PUBLICATIONS

Lee, Randy, et al., "Intersection of Parametric Surfaces and a Plane", IEEE CG & A, Aug., 1984, pp. 48–51.

Levin, Joshua, "A Parametric Algorithm for Drawing Pictures of Solid Objects Composed of Quadric Surfaces", Comm. of the ACM, vol. 19, No. 10, Oct., 1976, pp. 555–563.

Levin, Joshua, "Mathematical Models for Determining the Intersections of Quadric Surfaces", computer Graphics and Image Processing, vol. 11, 1979, pp. 73–87.

Lozano-Perez, Tomas, et al., "an Algorithm for Planning Collision-Free Paths Among Polyhedrial Obstacles", Comm. of the ACM, vol. 22, No. 10, Oct., 1979, pp. 560–570.

Meagher, Donald, "Geometric Modeling Using Octree Encoding", Computer Graphics and Image Processing, vol. 19, 1982, pp. 129–147.

Morgan, Alexander, "A Method for Computing All Solutions to Systems of Polynomial Equations", ACM Transactions on Mathematical Software, vol. 9, No. 1, Mar., 1983, pp. 1–17.

Mudur, et al., "Interval Methods for Processing Geometric Objects", IEEE CG & A, Feb., 1984, pp. 7–17.

Peng, Q. S., "An Algorithm for Finding the Intersection Lines Between Two B-Spline Surfaces", CAD, vol. 16, No. 4, Jul., 1984, pp. 191–196.

Requicha, A. A. et al., "Solid Modeling: Current Status and Research Directions", IEEE CG & A, Oct., 1983, pp. 25–37.

Sarraga, Ramon, "Algebraic Methods for Intersections of Quadric Surfaces in GM SOLID", Computer Vision, Graphics and Image Processing, vol. 22, 1983, pp. 222–238.

Segal, Mark, et al., "Consistent Calculations for Solid Modeling", Proc. of the Symposium on Computational Geometry, Jun. 1985, pp. 29–38.

Sinha Pradeep, et al., "Exploiting Topological and Geometric Properties for Selective Subdivision", Proc. of the ACM Symposium on computational Geometry, Jun. 5–7, 1985, Baltimore, Maryland.

Sinha, Pradeep, Ph.D. Thesis, "Surface-Surface Intersection for Geometric Modeling", Graduate School, Cornell University, Ithaca, N.Y., Jun. 1, 1986.

Sinha, Pradeep, "Ray Casting for TIPS-1 Solids and Application to Fast Shaded Image Generation", TR-49, Cornell Injection Molding Project, Sibley School of Mech. and Aero. Eng., Cornell University, Ithaca, N.Y. (not enclosed).

Toth, Daniel, "On Ray Tracing Parametric Surfaces", ACM SIGGRAPH 1985, vol. 19, No. 3, pp. 171–179.

Van Nostrand's Scientific Encyclopedia, 5th ed., 1976, pp. 1519–1520.

Srikanth, T. K., Designing Fault-Tolerant Algorithms for Distributed Systems Using Communication Primitives, Jan. 1986.

Rajaram, N. S., Artificial Intelligence-The Achilles Heel of Robotics and Manufacturing, Robotics Engineering, Jan. 1986.

Robinson, Douglas S., Euclid 3-D Solid Modeling Geometry CAD/CAM, Oct. 7, 1985.

Toueg, Sam; Perry, Kenneth J., ; Srikanth, T. K., Research Report, Aug. 1985.

Pickett, Mary S., Issues in Developing a CAD-Based Off-Line Robot Programming System, May 23, 1984.

Evans, Robert, Solid Modeling at Chandler Evans.

DesJardin, Suzy, Solid Modeling at Apple Computer.

Wilson, Peter R., Modeling Research in the U.S.A.

Burdick, David, Trends and Future Directions: Market Research.

Piteo, Joseph W., User Experiences: Dassault/IBM Catia.

Srikanth, T. K., Optimal Clock Synchronization, Aug. 1985.

(A) WITH BOUNDARY (B) WITHOUT BOUNDARY

SOLID-MODELING SYSTEM USING TOPOLOGY DIRECTED SUBDIVISION FOR DETERMINATION OF SURFACE INTERSECTIONS

STATEMENT REGARDING FEDERALLY SPONSORED RESEARCH

This invention was made with government support under research grant MEA-8200743 and DCR-8502568 awarded by the National Science Foundation. The Government may have certain rights in the invention.

This is a division, of application Ser. No. 308,975, filed Feb. 9, 1989, now U.S. Pat. No. 4,890,242, which is a continuation of Ser. No. 871,091, filed June 6, 1986, now abandoned.

TECHNICAL FIELD OF THE INVENTION

The present invention pertains generally to the fields of CAD/CAM and robotics and more particularly to determination of intersections between surfaces in a solid-modeling system.

BACKGROUND OF THE INVENTION

Solid-modeling in the realm of computer-aided shape design has rapidly emerged as one of the most important and challenging fields of manufacturing research and development. Although activity in this area was initiated by computerized drafting systems serving as no more than electronic drafting tables, its applications today exist in areas ranging from realistic image generation to CAD/CAM and robotics.

The roots of solid-modeling technology can be traced back to the computer-aided drafting systems that were developed during the early 70's; these systems—aptly called wireframe systems—could only handle the drafting of primitive points and curves. Soon, however, the need was felt for extending this facility to not only drafting with CAD systems but designing with them. Since solid parts cannot be modeled unambiguously by only points and lines, drafting systems were soon replaced by the so called solid-modeling systems. Today there are a host of solid-modeling systems available from commercial vendors or from universities.

The use of solid-modeling systems, however, has not been able to graduate much beyond producing shaded-graphics and computing mass-properties. Even for these simple applications, the domain of the modeling system is severely restricted. Amongst the variety of reasons that can be cited for the break in the previously phenomenal growth-rate of this technology is the fact that the algorithms used for various processing needs within solid-modeling systems are either not efficient, not reliable, or not general enough in their domain of application.

The ability to compute the intersection of two surfaces usually forms the heart of a solid-modeling system. Such processing is useful not only in building an internal representation for the object from its description, but also in applications such as collision-detection, that are built upon it. Many algorithms have been proposed to compute intersections of surfaces. However, the lack of a computationally efficient algorithm applicable to a wide range of surfaces has made the application of solid modeling systems infeasible in areas such as robotics, where complex processing operations such as sweeping are required.

Reliable intersection algorithms are known for quadric surfaces but they are not applicable to other surfaces such as bicubic patches or B-spline surfaces since they capitalize heavily on properties specific to the class of quadric surfaces. On the other hand, there are edge-tracking algorithms implemented in solid-modeling systems such as BUILD, ROMULUS and TIPS-1 that are potentially applicable to a wide variety of surfaces, but they need an initial point on each component of the intersection set before they can trace it out. Since there are no known reliable methods to even determine mine the number of components of the intersection set in general, these algorithms tend to be unreliable. In general, each algorithm has some advantages and disadvantages; there is no clear supremacy of any one intersection algorithm over the others and research continues on almost all of them.

Algorithms designed to compute intersections of surfaces need to satisfy certain criteria that arise in the context of solid-modeling. Some of these considerations are generality, reliability, accuracy, robustness and speed. An intersection algorithm should be general enough to handle as wide a variety of surfaces as exits in the domain of a solid-modeling system. For systems that model all surfaces under a uniform scheme the criterion is met automatically by any one intersection algorithm. However, for systems that use surface-specific properties in order to design special purpose, high speed algorithms, the amount of work required to include a new surface in the modeling domain can be prohibitive. This inhibits the upward expansion of a solid-modeling system and supports, at best, a very constrained modeling environment.

The intersection for geometric entities may be invoked in a solid-modeling environment towards two different ends.

1. to detect the intersection of two solids—here only a boolean result is desired—or
2. to construct a representation of the intersection set from the representations of the intersection solids.

Lack of reliability has different implications in the two above cases.

For purely detection purposes, reliability is important from the point of view of functionality. For example, in the automatic generation of numerical code for machining, a rapid traversal command may be inserted along a path where no collision with the workpiece or the fixtures is detected. However, if, in fact, there is a collision, then the tool is liable to break since tools are typically not designed to handle cutting at feed-rates of the order of rapid-traversal speeds. Similarly reliability is crucial in applications such as robot-motion-simulation and part-assembly verification systems.

When the intersection operation is used to construct a representation of the intersection set from the representation of the intersecting solids then unreliable intersections can cripple the algorithm by creating inconsistent topological data which do not permit proper termination of the algorithm. Considerable care therefore needs to be taken to detect all components of the intersection set. Algorithms suffering from this problem can be found in solid-modeling systems such as TIPS-1. The property of a solid-modeling system that prevents a system from terminating due to such internal errors, is also referred to in literature as robustness.

An intersection algorithm that computes approximate intersections from object representations does so only with a certain accuracy. The inaccuracies due to the algorithm itself are different from and in addition to those due to roundoff errors in floating point digital arithmetic. Such systems must then be able to compute how close the approximations are to the actual intersection sets. Different definitions of "closeness" may be formulated—each meaningful in the context of a desired application. One could, for example, call an intersection small if the diameter of each face is smaller than a defined $\epsilon$. On the other hand it may be called negligible if two planes can be determined that are some $\epsilon$ apart and contain the intersection set between them.

The need to determine whether an intersection is meaningful or not exists, for example, in keeping topological information consistent and in applications such as part assembly verification. Accuracy measures are also needed in order to estimate faithfulness of representation under various operations. In a flexible modeling system, intersection sets may be further operated on by functions such as sweep, intersect, etc. The representation of the final object so created may be geometrically—and even topologically—far from its actual representation because of accumulation of inaccuracies and magnifications thereof during operations. Such magnifications occur, for example, when points near a singularity are mapped; small errors in the points can get magnified to appreciable amounts in such operations.

The desire for high speed intersection operations, although practically contradictory to the idea of reliable intersections, is almost as important. Speed is essential for an effective design and manufacturing environment based on solid-modeling. In applications such as NC machining, thousands of swept volumes are typically created—one due to each cutter move. Each one of these is treated as a solid and subtracted from the workpiece. Constructing the actual representation of the finished workpiece from such complex solids can take upwards of 2 to 3 hours on a high speed mainframe.

The existing methods for intersections of solids may broadly be classified into two categories: exact and approximate methods. This categorization is not very rigid and is based broadly on the level of approximations that the intersection algorithm may assume. It is emphasized that this distinction is fairly nebulous and a wide-variety of algorithms pass off as what is known in literature as "semi-analytical methods".

The methods that fall into the exact method category are those that derive an exact representation of the intersection set through algebraic or semi-algebraic means from exact representations of the intersecting surfaces. They incorporate techniques from algebraic geometry and numerical linear-algebra to yield algorithms that are systematic and reliable. The substitution method, quantifier elimination method, Levin's Algorithm and Ocken's Method, are examples of the exact method intersection algorithm.

In contrast with the exact methods, the number of algorithms in the category of approximate methods is much larger. Also these methods are much more widely used in current systems because they are easier to encode and often more general. However, this is almost always at the cost of reliability and accuracy. Some algorithms are based on fairly sophisticated mathematical techniques while others are purely searching schemes adapted for the intersection problem. One numerical method, known as Morgan's Method and incorporated into GMSolid, has been found successful in practice. However, the method is good only for the intersections of three surfaces that yield a finite set of points and is not meant to compute a representation of the intersection of two surfaces. It can be used to compute a set of points along an edge of intersection, but it is not clear if it does so reliably and efficiently. Moreover, the method is limited to algebraic surfaces and degrades very fast with the degree of equations involved.

Also in the class of approximate methods are the polygonal algorithms. These algorithms compute intersections of a faceted representation (a piece-wise linear approximation) of the intersection surfaces. The computations involved are simple and fast, and hence, numerous commercial geometric modeling systems (such as Geomod, CITIA etc.) based on this intersection algorithm have cropped up. A very serious disadvantage of this algorithm, however, is its lack of reliability and accuracy: approximating badly oriented surface patches as flat polygons is subject to serious pitfalls whereby erroneous results may be obtained.

Tracking algorithms are also in the approximate method category and use an iterative procedure that assumes facilities such as computations of normal vectors and computation of the distance of a point from a surface. The main idea is that given a point x on the intersection edge, a good estimate to the next one may be obtained by stepping out in the direction of the tangent vector to the edge at x. Iterative techniques can then be used to "pull" the point down to an actual intersection point.

The tracking method is very general, and has been implemented in geometric modeling systems such as TIPS-1 and ROMULUS. The disadvantage of this algorithm is again the lack of reliability: Firstly, it assumes that the intersection set is actually an edge—in reality it may be only a point or itself a surface. Secondly, it needs an initial point on each component of the intersection set to start the tracking procedure. This has to be done by some heuristic means. The method is in general inefficient as well since the number since the "pulling" operation can be very expensive.

One other algorithm belonging to the class of approximate algorithms and the one germane to the present invention is the subdivision algorithm. The subdivision algorithm for computing intersections of surfaces is based on the divide and conquer paradigm. Given a surface and a processing task, the idea is to recursively subdivide the surface into smaller and smaller patches until each patch is small enough that processing a geometric approximation to the patches instead of the patches themselves yields results accurate to within acceptable bounds. This approach was first used by Catmull (See E Catmull, "A subdivision Algorithm for Computer Display of Curved Surfaces," University of Utah Comp. Sci Dept. UTEC-CSC-74-133, 1974), in generating shaded images of curved surfaces. A very natural extension of this scheme was found in computing intersections of curved surfaces. The intersection algorithm was first developed for B-spline surfaces (See Jeffery M. Lane and Richard R. Riesenfeld, "A Theoretical Development for the computer Generation and Display of Piecewise Polynomial Surfaces," Transactions on Pattern Analysis and Machine Intelligence, vol. PAMI-2, No. 1, January 1980), and later extended to include general parametric surfaces (See S. P. Madur, P. A. Koparkar, "Interval Methods for Processing Geometric Objections", IEEE CG&A, February 1984). The subdivision algorithm is very general in terms of the surfaces it can be used for. The disclosures of the above three publications are hereby incorporated by reference herein with particular respect to computation of intersections in the Madur publication.

A big advantage of the subdivision algorithm for intersection of surfaces lies in the fact that it works with a clear interface between the intersection algorithm and representation schemes. Hence, it is not tied to any representation scheme and is limited only by the existence of the defined interface. In this respect it is similar to approximate schemes such as the tracking method for computing intersections. Another advantage of the intersection algorithm is its reliability: theoretically, since surfaces can be subdivided to as small a size as possible, all intersections can be found. However, as will be shown below the current form of the algorithm cannot be both reliable and efficient.

The subdivision algorithm is capable of computing an arbitrarily close approximation to the intersection set by subdividing the surfaces to finer and finer levels. The prescribed way of controlling the closeness of the approximation is by suitably changing the flatness criterion. It may be noted, however, that in reported versions of the algorithm, the quantitative relationship between these two measures has not been explored or exploited.

A serious drawback of the subdivision algorithm is that, since in practice infinite sub-divisions are not possible and a linear approximation is used at some stage, it can sometimes miss a component of the intersection set. This becomes quite obvious if we assume that the surfaces shown in FIGS. 1 and 2 are flat to within the prescribed flatness criterion and follow the steps of the subdivision algorithm. For the case in FIG. 1, the intersection of the planar approximations to the surfaces will result in a straight line closely approximating the actual curve of intersection. For the situation in FIG. 2, however, such an approximation is not assured because the curve of intersection is a closed curve lying entirely in the interior of the surfaces. Interestingly, a curve with such a topology cannot possibly be obtained by the intersection of planar polygons.

As explained above, for some applications an intersection such as the one in FIG. 2 may be negligible. In fact, since the surfaces are flat to within some predefined tolerance limit and it may be acceptable to neglect intersections of such a nature. But for certain other applications, such an intersection may not be negligible. For example, it may be required to produce a new surface by sweeping the curve obtained by intersecting the given surfaces. In this case, it is not the flatness but the diameter of the intersection that has to be small for the intersection to be negligible. In general, a reliable solid-modeling system cannot choose to neglect such intersection.

To get around this problem, one may think of prescribing a more stringent flatness criterion. This, however, is not a general solution since—as emphasized by reported subdivision-algorithm implementations (See Elizabeth G. Houghton, Robert F. Emnett, James D. Factor, and Chaman L. Sabharwal, "Implementation of a divide-and-conquer method for the intersection of parametric surfaces", Computer Aided Geometric Design, 2, 1985, 173-183—one can construct a case as in FIG. 2 for any given flatness criterion.

A surer remedy, motivated by the fact that computer arithmetic and real life applications work only with finite precision, is to subdivide each surface until the patches are smaller than some working precision. Another approach on similar lines would be to subdivide each surface until it is flat to within such a working precision. Once the new definition of intersection based on the working precision has been incorporated into the algorithm (mainly in the polygon-intersection procedure), it could conceivably be made to yield approximations to the intersection set that are accurate to around the working precision. However, without even going into the details of implementation of such approaches, the following objections can be raised against them. First, the initial approach will be wasteful in general since it will subdivide surfaces intersecting as in FIG. 1 to the same extent as surfaces in FIG. 2. In the latter case, some new topological information may be uncovered by the refined subdivision. However, the only result of refined subdivision for a situation as in FIG. 1 is to further improve the already good approximation of the edge of intersection. Secondly, similar objection can be raised against the second approach. The intersection for all cases will have to be computed to working precision before the topological aspects—such as the number of components of the intersection set—are known. This is clearly wasteful in an application such as collision detection where it would be sufficient to determine the existence of non-existence of any components. Thirdly, a small tolerance would cause a proliferation of surface patches. Hence intersections may be computed reliably, but only at a considerably cost in terms of storage and computations.

SUMMARY OF THE INVENTION

According to the invention, there is provided a parallel processing system including a master processor and plurality of slave processors. A datum format for interprocessor datum transfer is specified wherein two fields in the datum hold first and second surfaces and wherein third and fourth fields correspond to a processing status and flatness tolerance parameter, respectively. A datum may have one of three designations: unprocessed; transversal; and unclassified. The parallel processor operation in initiated by a host computer depositing an unprocessed datum in the master processor, which then distributes the unprocessed datum to one of the slave processors. The slave processor test the datum surfaces for intersection by the mutual exclusion test and if no intersection exists, the datum is eliminated and the slave processor signals for a further datum. In an intersection set is determined to exist, the slave processor performs a transversality check on the datum and sets the processing status to indicate tranversality if it exists, and the datum is placed in an output buffer for return to the master processor. Otherwise, the surface pairs of the datum are subdivided to create a plurality of new datums which are returned to the master processor with an unprocessed status for further distribution by the master processor. According to yet another aspect of the invention, the slave processor performs flatness tests for the datum surfaces prior to subdivision and returns the datum with the status of unspecified if the tolerance is met.

These and other salient features of the invention, together with more subtle aspects of thereof, will be described in more detail below with respect to the specification and the drawings hereof.

DETAILED DESCRIPTION OF THE INVENTION

Figure 3:
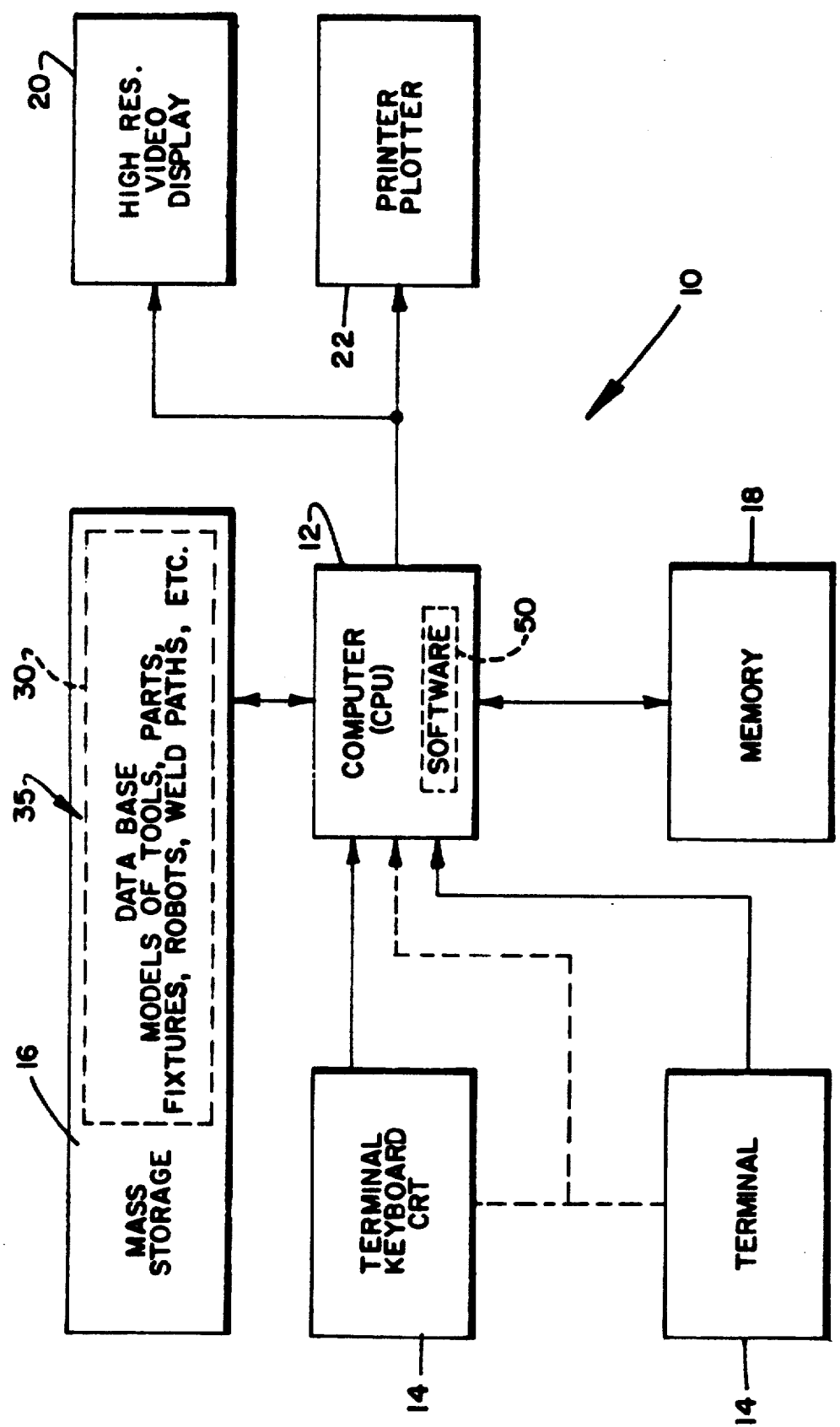
FIG. 3 is an overall view of the computer system according to the present invention.
Figure 4A:
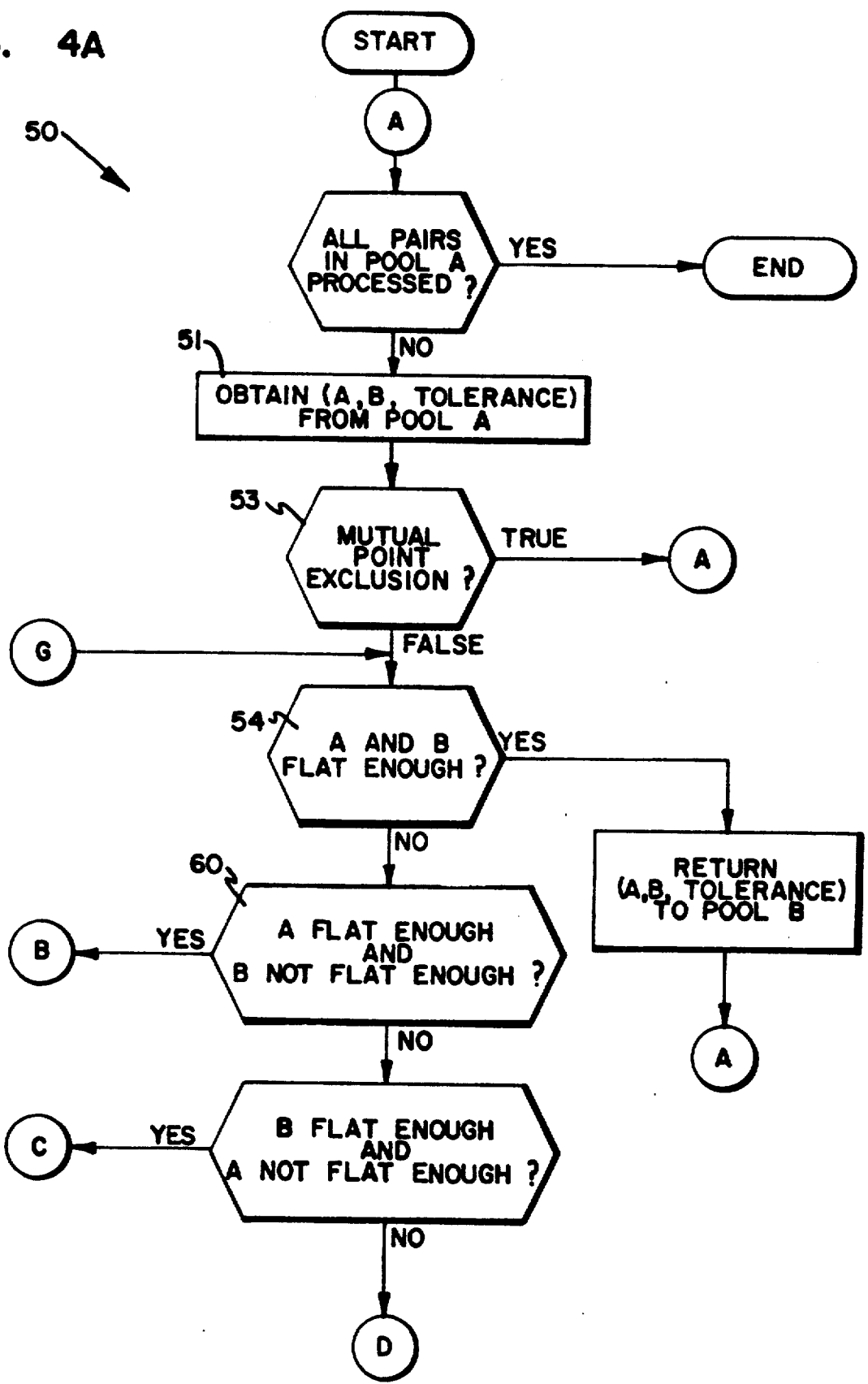
FIGS. 4A, 4B, 4C, 4D, 4E, 5A and 5B illustrate software subdivision routines according to the present invention.
Figure 4B:
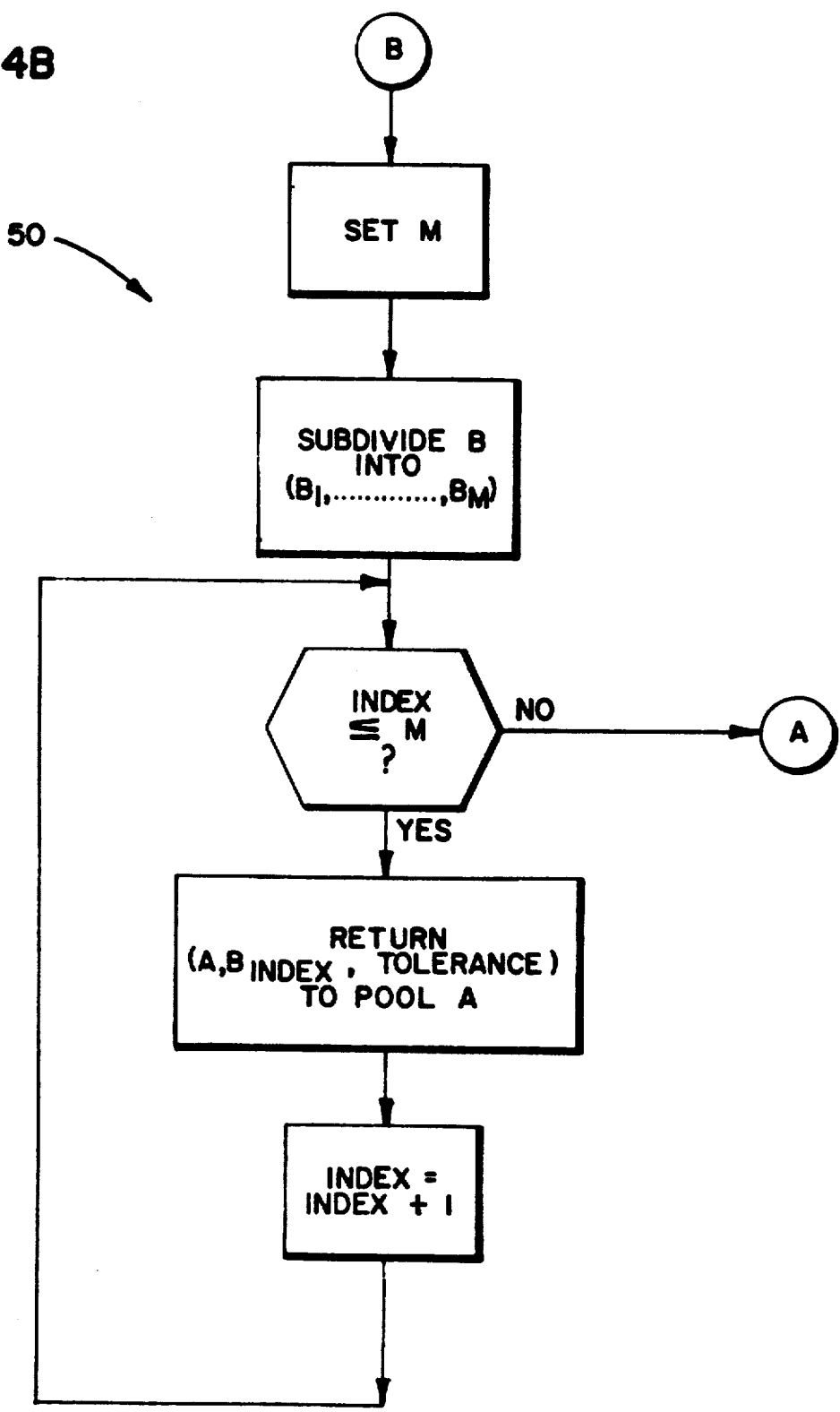
Figure 4C:
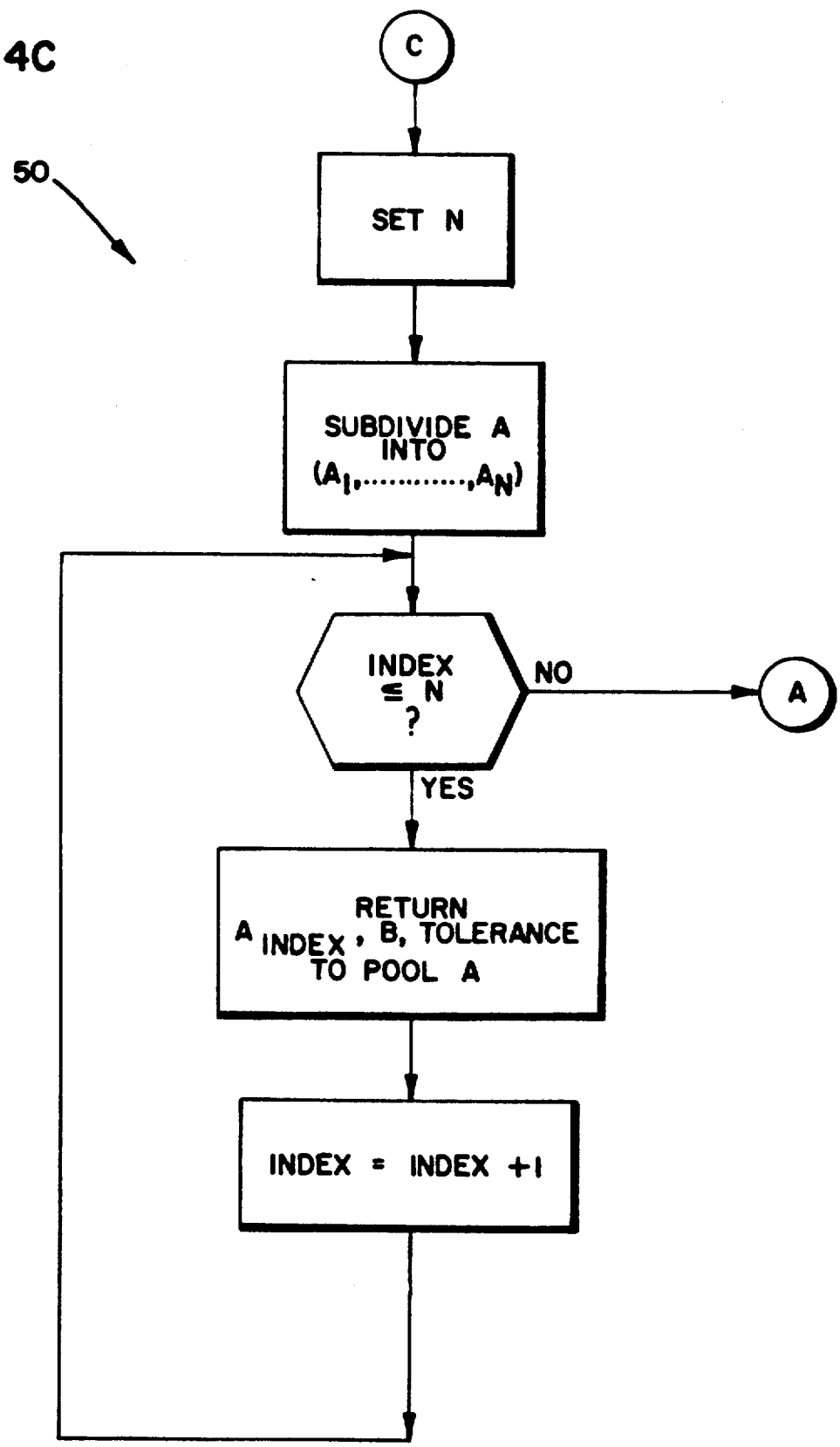
Figure 4D:
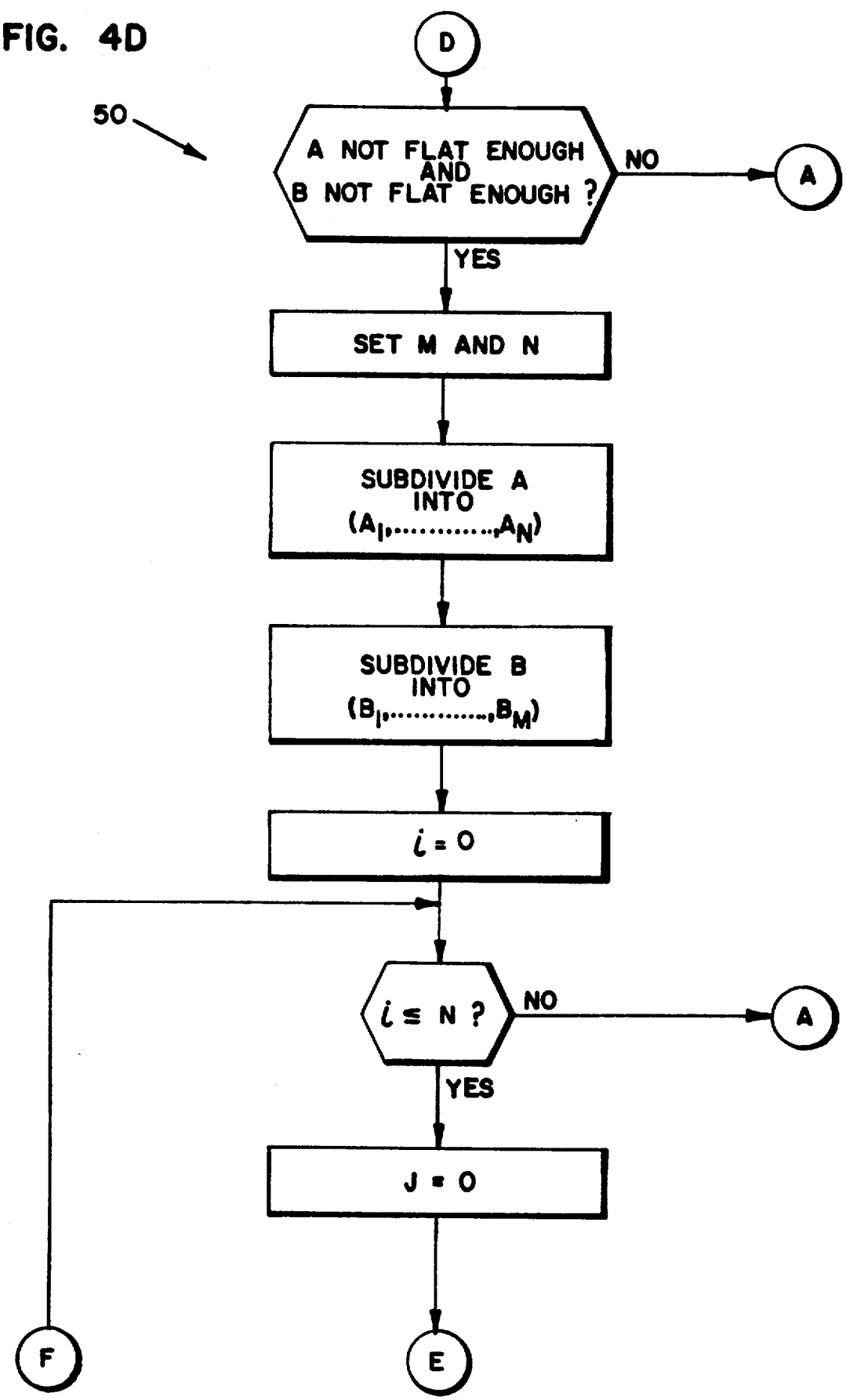
Figure 4E:
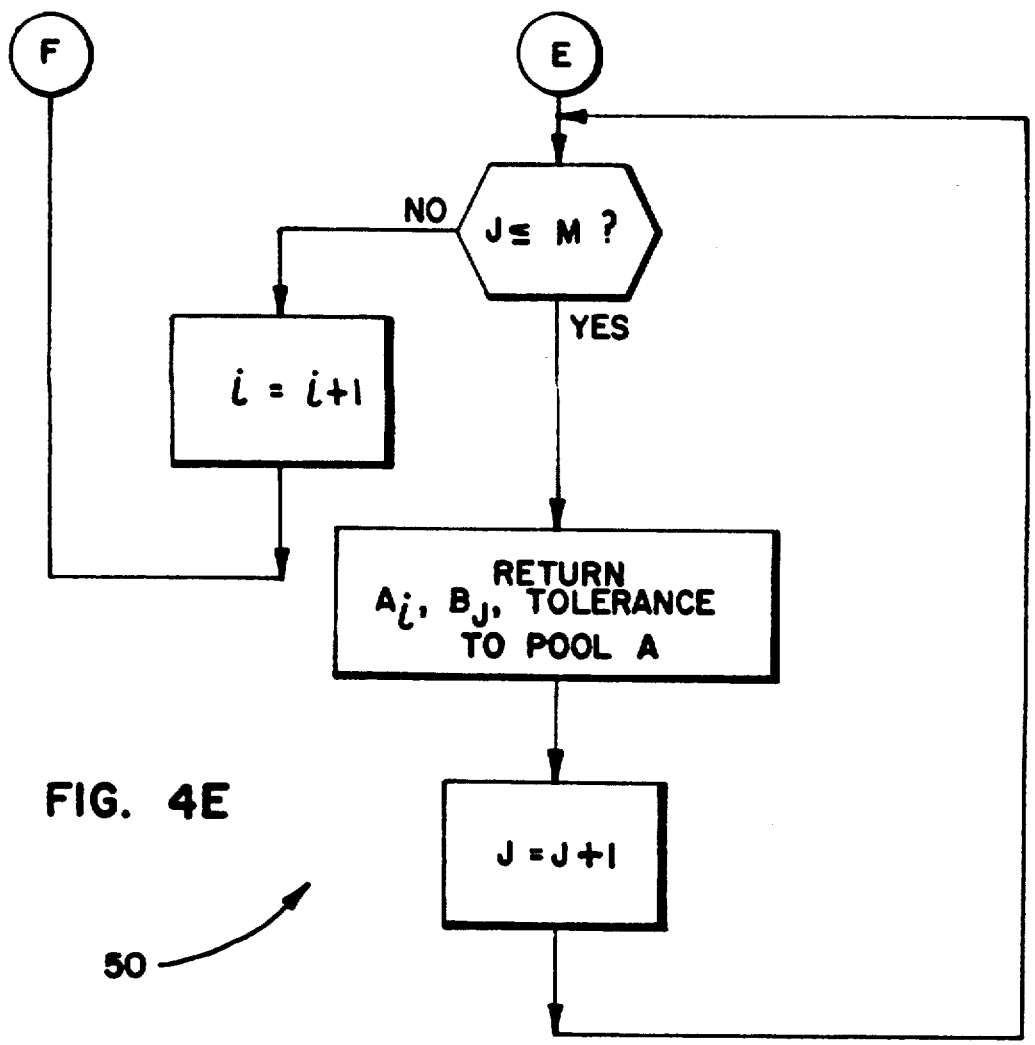

Referring to FIG. 3 there is illustrated a solid-modeling computer system 10 according to the present invention. Computer system 10 includes a high speed central processing unit (CPU) 12, one or more terminals 14, mass storage 16, for instance magnetic tape or disk drives, a solid-state memory 18, one or more communication interfaces (such as a network interface), a high resolution video display 20 and a printer plotter 22.

Mass storage 16 is illustrated containing a database 30 for storing solid models 35 representing, for instance, models of tools, parts, fixtures, robots, robot weld paths etc. Solid models 35 may be represented in database 30 in a number of different ways, such as in the form of boundary representations, and faceted representations. Preferably, solids are represented so that it is possible to extract information about surface patches whose disjoint union comprises the bounding surfaces of the solid.

Referring now to FIGS. 4A, 4B, 4C, 4D and 4E, there is shown a generalized version of the algorithm for identifying surface-surface intersections as implemented in the software of solid-modeling system 10. Flow chart 50 represents the portion of the system software pertaining to carrying out the subdivision procedure. As explained generally, procedures 50 includes a first segment (51) for obtaining a pair of surfaces A and B from first and second models respectively, for which the intersection set is sought to be determined. Note that A and B need not be surfaces, one or both of them may be curves. However, for the purpose of illustration of the algorithm the discussion will focus on surfaces. For each surface pair (A,B) a flatness tolerance is specified. At segment 53 a mutual point exclusion test is performed, for example using MIN-MAX boxes for each surface. If the test is positive, indicating no intersection the procedure returns and selects the next surface pair to process. Otherwise, the surfaces are tested for flatness against the flatness tolerance ("tolerance") specified for the surfaces (54).

If A and B satisfy the flatness criterion software 50 stores the (A,B) pair in a global pool of processed surfaces in memory 18 or more storage 16, whereby further subdivision of the surface is terminated. It should be noted that the portion of the system software actually performing intersection computation retrieves surface pairs from this pool.

If either or both of surfaces A and B do not satisfy the flatness criterion, program execution proceeds to segments 60 wherein the surface which are not flat enough are subdivided into a plurality of smaller surfaces $A_1, A_2 \ldots A_n$ or $B_1, B_2 \ldots B_m$. Subdivision recursively proceeds on each $(A_i, B_j)$ pair until the flatness criteria is reached or mutual point exclusion is proved.

As noted in the Background section hereof, nontransversal intersections may be accommodated by subdividing until a surface is either smaller of flatter than required working precisions. Such an approach, however, is impractical because the algorithm cannot discriminate between areas which require extensive subdivision and those which does not. Thus, setting stringent flatness or patch area criterion results in a substantial, unworkable excess of computations. Furthermore, there in no guarantee that setting a particular flatness will result in the correct computation of the topology of the intersection set.

The present invention provides an alternative to unnecessary subdivision by introducing a check on the transversality of the intersection of a surface pair. If it can be established that a transversal intersection exists, then the intersection can be determined definitely by conventional computation. Accordingly, further subdivision is not required and may be terminated for the pair. On the other hand, if the transversality of the intersection cannot be established, subdivision can proceed until transversality can be established or until the desired flatness or patch size criterion is met.

Figure 5A:
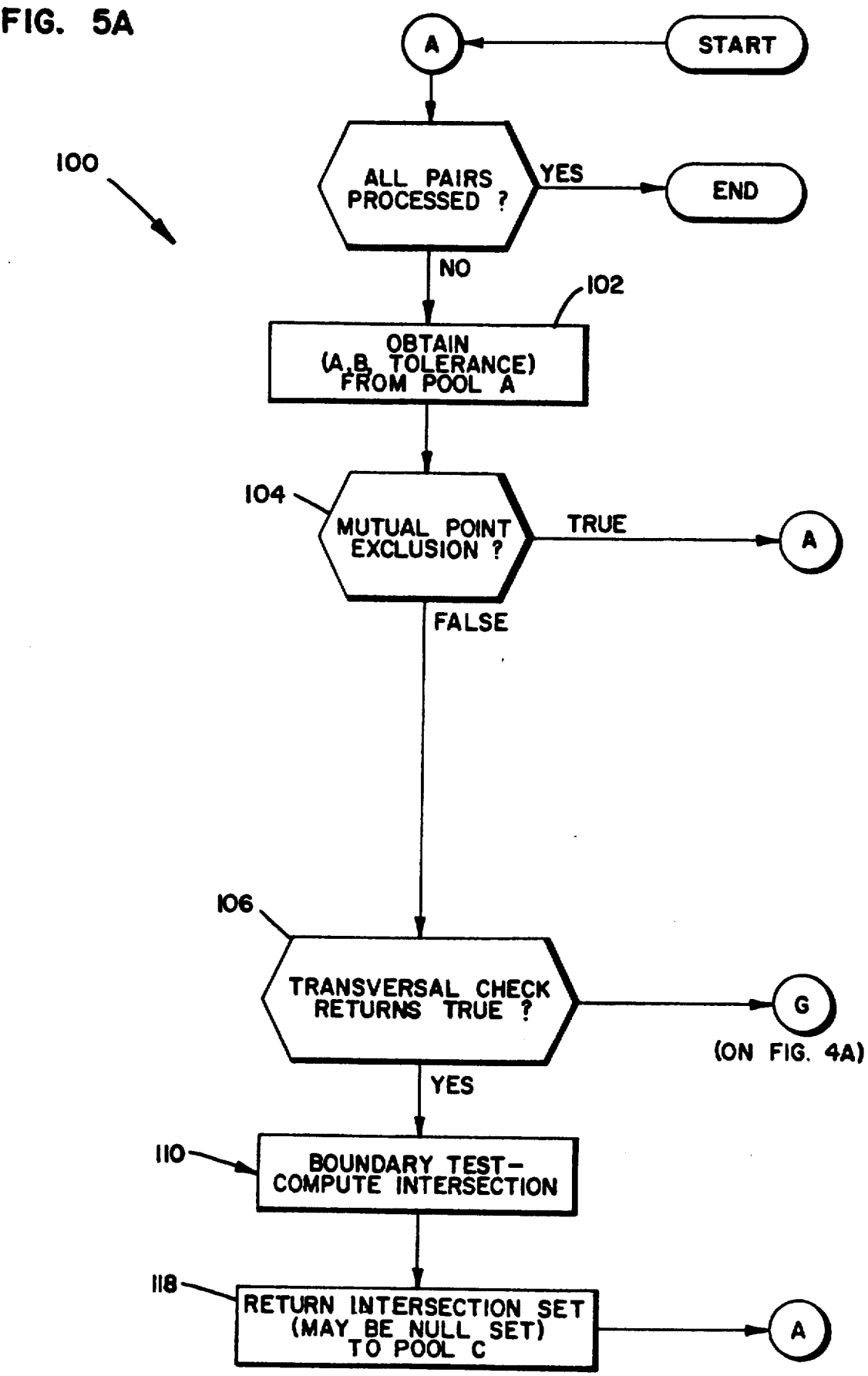

Referring now to FIG. 5A the subdivision procedure 100 according to the present invention is illustrated in terms of a modification to the procedures of FIG. 4. Procedure 100 starts in the same manner as procedure 50 by obtaining a surface pair (102) and performing a mutual point exclusion test (104). Procedure 100, however, adds an additional program segment 106 which checks the transversality of the intersection of the surface pair and it transversal determines if the surfaces actually intersect. The latter is accomplished by the boundary test described later. With respect to procedure 50, this segment is located between segments 52 and 54. Thus, if the non-null transversal intersection is determined, the surface pair is returned to a global pool of known intersecting pairs and further subdivision on the pair is terminated. If transversality cannot be established, the procedure goes on to test for flatness and proceeds to subdivide if necessary, as illustrated with respect to segments 54 and 60 in FIG. 4A.

Accordingly, the present invention provides means for terminating further unnecessary subdivision in the case of transversal surface pairs. For pairs not proved to be transversal, it returns intersections smaller than any specified working tolerance. The tolerance can be specified using the flatness or patch size criterion. For non-transversal intersections the transversality check will never succeed, and termination will result as specified tolerance. However, the worst the enhanced procedure can do in this situation is to output whatever the conventional procedure would.

The transversality check of the present invention is accomplished using a test derived from a pair of theorems establishing certain aspects of the intersection set of a pair of surfaces.

The following definitions and lemmas are provided as background explanatory material relevant to these theorems, hereinafter referred to as theorems 1 and 2.

MANIFOLDS AND TRANSVERSALITY

Definition 1.1

A mapping $f$ of an open set $U \subset R^n$ into $R^m$ is called smooth it has continuous partial derivatives of all orders.

Definition 1.2

A map $f:X \to Y$ defined on an arbitrary subset X in $R^n$ is called smooth if it may locally be extended to a smooth map on open sets; that is, if around each point $x \epsilon X$ there is an open set $U \subset R^n$ and smooth map $F:X \to Y$ such F equals $f$ on $U \cap X$.

Definition 1.3

A smooth map $f:X \to Y$ of subsets of two Euclidean spaces is a diffeomorphism if it is one to one and onto, and if the inverse map $f-1:Y \to Y$ is also smooth. X and Y are diffeomorphic if such a map exists.

Definition 1.4

Let X be a subset of some ambient space $R^N$. Then X is a smooth k-dimensional manifold if it is locally diffeomorphic to $R^k$; that is, each point in X possesses a neighborhood V diffeomorphic to an open set U of $R^k$.

Definition 1.5

The diffeomorphism $\phi:U \to V$ defined above is called a parametrization of the neighborhood V.

Manifolds may actually be defined and studied without an a priori embedding in some Euclidean space. However, for the purpose of discussions presented here, it suffices to define and study manifolds in this restricted setting. Intuitively, one can imagine manifolds to be hypersurfaces, that can be smoothly flattened out locally to look like a hyperplane of some dimension. An example of a 1-manifold is a circle in a plane; although the circle can never be globally deformed to look like $R^1$, it is still a 1-dimensional manifold embedded in $R^2$ since the neighborhood of each in it can be smoothly deformed to look locally like an open interval in $R^1$. $R^k$ is itself an example of a k-dimensional manifold since every point in it has a neighborhood diffeomorphic to itself.

Definition 1.6

Let X and Z be smooth manifolds in $R^n$ such that $X \subset Z$. Then X is a smooth submanifold of Z. Thus, manifolds embedded in an Euclidean space are automatically submanifolds since the ambient Euclidean space is itself a manifold.

Definition 1.7

The codimension of an arbitrary submanifold X of Z is defined by $$\text{codim}(X) = \dim(Z) - \dim(X).$$

Definition 1.8

Let X be a smooth k-dimensional submanifold of $R^n$. Let $\phi:U \to V$ be a parametrization of a neighborhood B of $x \epsilon X$. Assume $\phi(0) = x$ for convenience. Then the tangent space of X at x, denoted $T_x(X)$, is defined to be the image of the map $d\phi_0:R^k \to R^n$.

Though the definition uses a specific parametrization of the manifold in the neighborhood of x, it is true that the tangent space is independent of such parametrization (see Guillemin et. al., *Differential Topology*, Prentice Hall, Inc., Englewood Cliffs, N.J. (1974). The tangent space of a manifold at a point gives the best linear approximation to the manifold in the neighborhood of the point.

Definition 1.9

If X and Y are two submanifolds of $R^N$, then X and Y are said to be transversal if for every $z \epsilon X \cap Y$, $$T_z(X) + T_z(Y) = R^N,$$

i.e., $T_z(X)$ and $T_z(Y)$ together span $R^N$.

In the following theorem, presented without proof, the term submanifold implies a smooth submanifold. Proof of the theorem may be found in Guillemin et al., *Differential Topology*, Prentice Hall, Inc., Englewood Cliffs, N.J. (1974).

Theorem 1.1 (Transversality Theorem)

The intersection of two transversal submanifold X and Y of Z is again a submanifold. Moreover, $$\text{codim}(X \cap Y) = \text{codim}(X) + \text{condim}(Y).$$

For the case of 2-dimensional submanifolds of $R^3$, theorem 1.1 merely says that if X and Y are transversal, then $$T_x(X) \neq T_x(Y) \text{ for all } x \epsilon X \cap Y.$$

This condition for surfaces in $R^3$ can also be expressed in a different—and perhaps more intuitive—way than defined above: Let $N_x(X)$ be a unit vector in $R^3$ such that $[N_x(X),v] = 0$, for all $v \epsilon T_x(X)$, where $<,>$ denotes the usual inner product of vectors in $R^3$. (Note that there are two such vectors at each point and for the purpose of the discussion here, it does not matter which one of these is chosen.) $N_x(X)$ is called the normal vector to X at point x. Expressed in terms of normal vectors, the Transversality Theorem (theorem 1.1) states that two surfaces X and Y are transversal if and only if $$N_x(X) \neq \pm N_x(Y) \text{ for all } z \epsilon X \cap Y.$$

Transversal Intersections

Smooth surfaces in $R^3$ are essentially smooth 2-dimensional submanifolds. The term "face"]will hereinafter be used to refer to the subsets of the 2-manifolds defined above.

The tangent space at any point x belonging to a face may be defined as the tangent space of the underlying 2-manifold at the point x. Because the dimensionality of the manifold is 2, the tangent space at a point on a face is a plane in $R^3$. Smoothness of the underlying manifold guarantees that the tangent plane exists at each point of the face.

Since a face is a subset of its underlying 2-manifold, the intersection of the two faces can be viewed as a subset of the intersection set of the underlying manifolds. The intersection of 2-manifolds itself can be characterized using the Transversality Theorem (Theorem 1.1) above, giving the following result:

Lemma 1.1

The intersection set of two transversal 2-manifolds is a 1-manifold.

Proof of Lemma 1.1

The codimensions of each 2-manifold in $R^3$ is $3-2=1$. Since the manifolds are transversal the codimension of intersection set, from theorem 1.1, is $1+1=2$. Hence, the intersection set is of dimension $3=2-1$, i.e., it is a 1-manifold.

The lemma 1.1 does not hold for the intersection of faces; the intersection set for the intersection of two faces is a subset of a 1-manifold and may have different dimensionality. Moreover, this intersection set has additional topological properties not common to the intersection set of two 2-manifolds. These are presented in the theorems following the three lemmas that they are based on. The lemmas, stated without proof here, are standard results from topology results.

Lemma 1.2

Let Y be a subspace of X. Then a set A is closed in Y if and only if it equals the intersection of a closed set of X with Y.

Lemma 1.3

A subset A of $R^n$ is compact if it is closed and bounded in the usual Euclidean metric.

Lemma 1.4

Every closed subset of a compact space is compact.

Theorem 1.2

The intersection of two faces is compact.

Proof of Theorem 1.2

Let X and Y be the two intersecting faces. From lemma 1.2, it is derived that the intersection set is closed in the space of X. Since X is a closed and bounded subset of $R^3$, by lemma 1.3 it is compact. Then, from lemma 1.4, the intersection set is compact in $R^3$.

Theorem 1.3

The transversal intersection of two faces is a closed subset of a 1-manifold.

Proof of Theorem 1.3

Let X and Y be two faces. Construct X' as union of X with open neighborhoods in the underlying manifold of all points $x \in X$. Similarly, construct Y' from Y. Then the sets X' and Y' are 2-manifolds. Moreover, by choosing small enough neighborhoods of points on the boundary, it can be ensured that the X' and Y' are transversal. Then, by lemma 1.1, the intersection of X' and Y' is a 1-manifold. Call this 1-manifold Z. Since X and Y are closed in $R^3$, by lemma 1.2, $Z \cap X$ and $Z \cap Y$ are closed subsets of Z. Hence, the intersection of the two faces $(Z \cap Y) \cap (Z \cap X)$ is also closed in Z.

These topological properties, although meaningful, do not define the exact nature of the shape of the intersection set. An essential concept in the physical interpretation of the shape of the intersection set is that of connected components. We define these below and use it in the characterization of the intersection set.

Definition 1.10

Let X be a topological space. A separation of X is a pair U, V of disjoint non-empty open subsets of X whose union is X. The space X is said to be connected if there does not exist a separation of X.

Definition 1.11

Given X, define an equivalence relation on X by setting $x \sim y$ if there is a connected subset of X containing both x and y. The equivalence classes are called the components (or "connected components") of X.

Lemma 1.5

A component of a space Z is closed in Z.

Proof of Lemma 1.5

Let Y be a component and $X_i$, $i \in J$, be the set of all other components of Z. Then the space $Y \cup X_i$ is not connected for all $X_i$, $i \in J$; otherwise, by definition 1.11, Y would not be a component being a proper subset of a connected set. Hence, there exists a separation of $Y \cup X_i$ into disjoint non-empty sets $U_i$ and $V_i$ that are both open and closed in $Y \cup X_i$ and, since Y and $X_i$ are connected, such that $Y \subset U_i$ and $X_i \subset V_i$. Now, since $U_i$ is closed in $Y \cup X_i$, therefore $U_i = \overline{U}_i \cap (Y \cup X_i)$ for some $\overline{U}_i$ closed in Z. Since $U_i \cap V_i = \phi$ and $Y \subset \overline{U}_i \subset (z - X_i)$, therefore $Y \subset \cap_{i \in J} \overline{U}_i \subset \cap_{i \in J}(Z - X_i) = Z - \cup_{i \in J} X_i = Y$; and thus $\cap_{i \in J} \overline{V}_i = Y$. Since intersections of closed sets are closed, it can be concluded that Y is closed.

Lemma 1.6

Each connected component of the intersection set of two faces is compact.

Proof of Lemma 1.6

Let Z be the intersection set of the two faces. Then, by theorem 1.2, Z is compact. By lemma 1.5 each component of Z is closed in Z. Then by, lemma 1.4, each component is compact.

Theorem 1.4

Every connected one-dimensional manifold is diffeomorphic to $R^1$ or to $S^1$. Proof See Spivak, Michale A., "A Comprehensive Introduction to Differential Geometry", Vol. 1, 2nd ed., Publish or Perish, Inc., Berkeley, Calif., (1979).

Theorem 1.5

The only connected subsets of $R^1$ are isolated points, intervals and rays.

Proof of Theorem 1.5

Isolated points are clearly connected. Intervals are sets of the form (a,b), (a,b], [a,b], and [a, b) where $a,b \in R^1$. Rays are subsets of $R^1$ of the form $(a, +\infty)$,

[a,+∞), (−∞,b], and (−∞,b), a,b∈$R^1$. The proof that these are connected can be found in Munkres, James R., "Topology: A First Course.", Prentice-Hall, Englewood Cliffs, N.J., (1966). That these are the only connected sets is clear from the fact that $R^1$ is the union of two rays, and taking a point or an interval away from a ray or an interval yields two connected components each of which is either a ray or an interval or a point. Hence, any connected subset of $R^1$ is a point, a ray or an interval.

Finally we have the characterization of the intersection of two faces:

Theorem 1.6

Each connected component of the intersection set of two transversal faces is diffeomorphic to a point, or [a,b], or to $S^1$.

Proof of Theorem 1.6

By theorem 1.3 and lemma 1.6, each component of the intersection set of two transversal faces is a compact subset of a 1-manifold. Any 1-manifold is either diffeomorphic to $R^1$ or to $S^1$. A connected and compact subset of $S^1$ is either $S^1$ itself or a connected compact subset of $R^1$ since taking any point away from $S^1$ makes it diffeomorphic to $R^1$. From theorem 1.5, the connected subsets of the real line are isolated points, intervals or rays. Of these, the only compact subsets are the isolated points, or intervals of the form [a,b]—called closed intervals. Hence, we have the statement of the theorem.

Figure 6A:
FIGS. 6A and 6B are illustrations of Theorem 1.4 set forth in the specification according to the present invention.
Figure 6B:
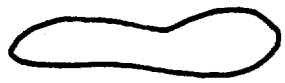

The set of allowable geometries enumerated in the last theorem for the intersection of two transversal faces is illustrated in FIG. 6. In simpler terms, up to diffeomorphisms, there are only two possible intersection geometries besides the isolated point:
1. Those which have a non-empty set of boundary points—these are smooth arcs with end-points, and
2. Those which have an empty set of boundary points—these are smooth closed loops.

Finally, one more result is derived that pertains to the endpoints of the arcs and the isolated points of an intersection set:

Lemma 1.7

Let x be a point of the intersection set of two transversal faces, X and Y, such that it does not have a neighborhood diffeomorphic to an open set of $R^1$. Then either x lies on the boundary of X or it lies on the boundary of Y.

Proof of Lemma 1.7

Suppose x belongs to the interior of both X and Y. Let U⊂X and V⊂Y such that x∈U and x∈V. Then, the intersection of U and V is a 1-manifold without boundary that is a subset of X∩Y. Hence, x cannot be the boundary point of a path-connected component of the intersection set. To facilitate the statement of theorems 1 and 2, two maps will first be defined:
a) N:→$R^3$ that assigns to each point x in a surface S, the unit normal vector $N_x(S)$ defined in the last section. Note that the map actually goes to the unit sphere $S^2$, i.e. N:S→$S^2$ ⊂ $R^3$.
b) D:$S^2 \times S^2$→$R^1$ such that D(p,q)=$\sqrt{1-(p,q)^2}$, where p and q denote points on $S^2$ as well as vectors from the center of $S^2$ to the points. This function is simply a vector version of the distance function defined for vector subspaces. See Golub, et al., *Matrix Computations*, The Johns Hopkins University Press, Baltimore, Md. (1983). In fact, if P and Q are 1-dimensional vector subspaces of $R^3$ containing p and q respectively, then D(p,q)=distance(P,Q). From this equality and the fact that the distance function is a metric (see Golub, et al.), it follows that the function D obeys the triangle-inequality, i.e., $$D(p,q)+D(q,r) \geq D(p,r), \text{ for } p,q,r \in S^2.$$

Note that D fails to be metric in the usual sense it maps a pair of antipodal points on $S^2$ to 0. If, however, D were defined on $RP^2$, the real projective plane obtained by identifying antipodal points in $S^2$, then D would be a metric. Theorem 1 follows easily from the following three propositions.

Proposition 1.

Given a closed smooth curve, C, and a 2-dimensional vector subspace, P, of $R^3$, there exists a point x on C such that $T_x(C) \subset P$.

Proof of Proposition 1:

The vector subspace P defines a plane through the origin in $R^3$. Since, from the discussion in the last section, the curve C⊂$R^3$ is compact, it is also closed (topologically) and bounded. Hence, it is possible to translate the plane P along its normal vector until it does not intersect C. From such an initial position, translate the lane along the normal vector towards C. Let x be the point on the curve that first contacts the plane. Then $T_x(C) \subset P$. For, otherwise, since the curve is smooth and closed, it will lie on both sides of the plane so that x cannot be the first point of contact.

Proposition 2

If two smooth surfaces $S_1$ and $S_2$ intersect transversally then the intersection is a smooth curve, C, in $R^3$. Moreover, if x∈C then $(N_x(S_1) \times N_x(S_2)) \in T_x(C)$, where x denotes the vector-product in $R^3$.

Proof of Proposition 2

That $(N_x(S_1) \times N_x(S_1) \times N_x(S_2)) \in T_x(C)$ follows from the fact that $T_x(C)=T_x(S_1) \cap T_x(S_2)$. Smoothness of the intersection is a result of Theorem 1.1 presented above.

Proposition 3

Let v be a unit vector in $R^3$ and P a plane through the origin with unit normal vector w. Define Q to be a plane containing all vectors in the subspace spanned by V and w. (This plane may not be unique if v=±w.) Let v be a unit vector in P∩Q. Then, for any unit vector u in P, $$D(v,v) \leq D(u,v)$$

Proof of Proposition 3

Figure 7:
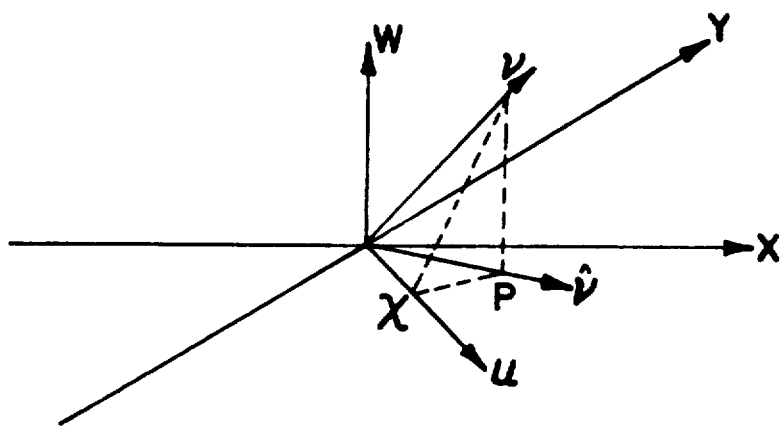
FIG. 7 is a construction for Proposition 3 set forth in the specification according to the present invention.

Drop a perpendicular from v to the plane P. (Again, we shall use a notation such as v to denote both a point as well as the vector from the origin to the point.) Let p be the point where it hits the plane. Define v to be the unit vector directed along the vector p (see FIG. 7). Then v∈P and v∈Q. Since v is a unit vector, D(v,v)=|p−v|. This follows from the fact that the function D actually maps a pair of unit vectors to the sin of the angle between them. Now let u be any other unit vector in P such that U≠±v. Drop a perpendicular from point v to the line in P containing u. Let it hit the line in point x. Then |(p−v)| ≤ |(x−v)| because (p−v)

is orthogonal to $(x-p)$. Also $D(u,v)=|(x-v)|$. Hence, $D(v,v)=|(p-v)|\leq|(x-v)|=D(u,v)$.

Theorem 1

Let $S_1$ and $S_2$ be two smooth surfaces in $R^3$ and let $W_1$, $W_2$ be subsets of $S^2$ containing points $x_1$ and $x_2$ such that a) $W_1=\{x\epsilon S^2|D(x,x_1)\leq\delta_1\}$, for some $\delta_1\geq 0$ and $W_2=\{x\epsilon S^2|D(x,x_2)\leq\delta_2\}$, for some $\delta_2\geq 0$ b) $N(S_1)\subset W_1$, and $N(S_2)\subset W_2$ If $W_1\cap W_2=0$ then the surfaces $S_1$ and $S_2$ do not intersect in a closed curve.

Proof of Theorem 1

Figure 8:
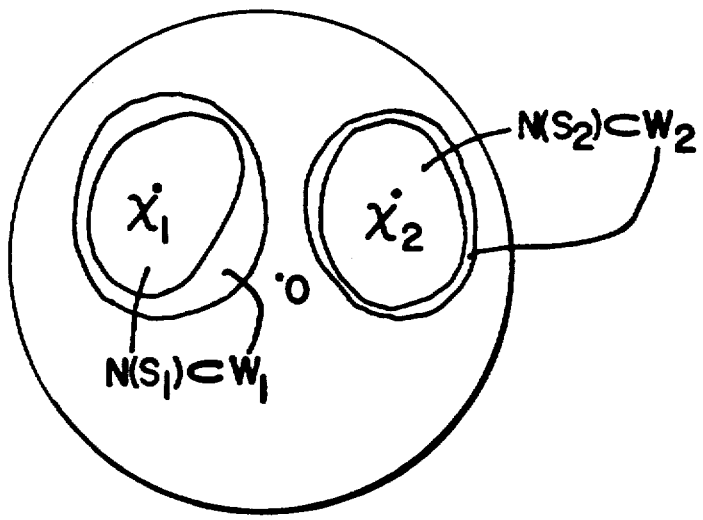
FIG. 8 is an illustration of the statement of Theorem 1 according to the present invention.

The statement of the theorem is illustrated in FIG. 8. The theorem shall be proved by contradiction. Suppose that $S_1$ and $S_2$ intersect in a closed curve, C. Define Q to be the plane through the three points $x_1$, $x_2$ and O, the center of $S^2$. From Proposition 1, there exists a point x on C such that $T_x(C)\epsilon Q$. By Proposition 2, $T_x(C)\supseteq N_x(S_1)\times N_x(S_2)\epsilon Q$. If $N_x(S_1)=\pm N_x(S_2)$ then the theorem is true since $W_1\cap W_2\neq 0$. So assume $N_x(S_1)\neq\pm N_x(S_2)$ and define P to be the unique plane through $N_x(S_1)$,$N_x(S_2)$, and 0. Let w denote a unit vector in $T_x(C)$ and v denote a unit vector in $P\cap Q$. Then, the plane Q contains the normal vector, w, to plane P, and the vectors $x_1$ and $x_2$. Hence, from Proposition 3, $D(x_1,v)\leq D(x_1, N_x(S_1))\leq\delta_1$ so that $v\epsilon W_1$. Simmilarly, $D(x_2,v)\leq D(x_x, N_x(S_2))\leq\delta_2$ so that $v\epsilon W_2$. Therefore, $v\epsilon W_1\cap W_2$. This contradicts the assumptions of the theorem.

Theorem 2

Suppose $S_1$ and $S_2$ are two surfaces smoothly embedded in $R^3$ with $S_1\cap S_2=\partial S_1=\partial S_2$. Suppose $S_1$ and $S_2$ are both diffeomorphic to the unit disc, and are transverse to each other along their common boundary. Then there are points $x\epsilon S_1$ and $y\epsilon S_2$ such that $T_x(S_1)$ is parallel to $T_y(S_2)$.

Proof of Theorem 2

Figure 9:
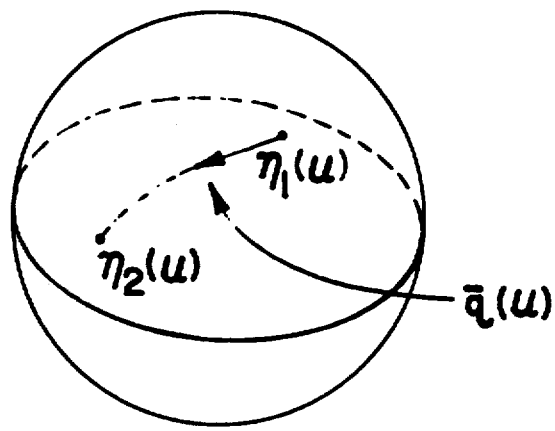
FIG. 9 is an illustration of the statement of Theorem 2 according to the present invention.

Let $D^2$ be the unit disc in $R^2$. Let $f_1:D^2\rightarrow S_1$, and $f_2:D^2\rightarrow S_2$ be parameterizations of $S_1$ and $S_2$ such that $f_1|\partial D^2=f_2|\partial D_2$. For $i=1,2$ define $\eta_i:D^2\rightarrow S^2$, by $\eta_i(u)=N_{f_i(u)}S_i$. (Note: for each i there are two ways of defining $\eta_i$. They differ by a sign and it makes no difference which one is used.) Suppose the conclusion of theorem is false. Then $\eta_1(u)\neq\pm N_2(u)$ for all $u\epsilon D^2$. It follows that for each $u\epsilon D^2$ there exists a unique unit tangent vector in $T_{\eta_1(u)}(S^2)$ pointing in the direction of the shortest great -circle path from $\eta_1(u)$ to $\eta_2(u)$. Denote the vector by $\bar{q}(u)$ (see FIG. 9). Thus $\bar{q}:D^2\rightarrow US^2$, where $US^2$ is the unit tangent bundle to $S^2$. Define $q=\bar{q}|\partial D^2$. Since q is the restriction of a map defined on the disc $D^2$,q is null-homotopic. The proof is finished by finding a contradiction to this assertion. Let N be a small tubular neighborhood of $\partial S_1$ in $R^3$. Assume that $F_2=N\cap S_2$ is a topological annulus.

Claim

Figure 10:
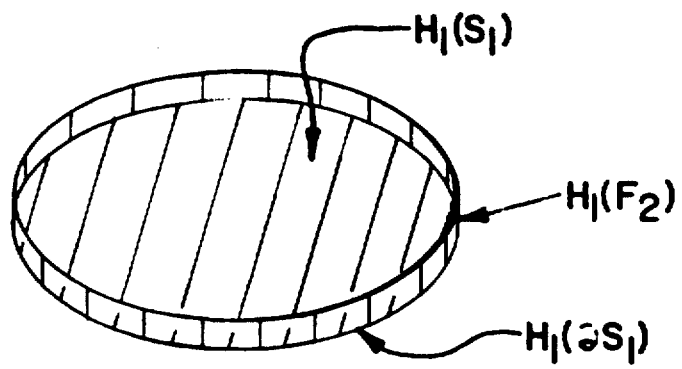
FIG. 10 is an illustration of a claim asserted in the proof of Theorem 2 according to the present invention.

There exists a smooth isotopy $H_1$ of $R^3$ such that $H_0=id_{R^3}$, while $H_1(S_1)$ is a round planar disc, and $H_1(F_2)$ is orthogonal to $H_1(S_1)$ where they meet (see FIG. 10).

Sketch of Proof of Theorem 2

Figure 11:
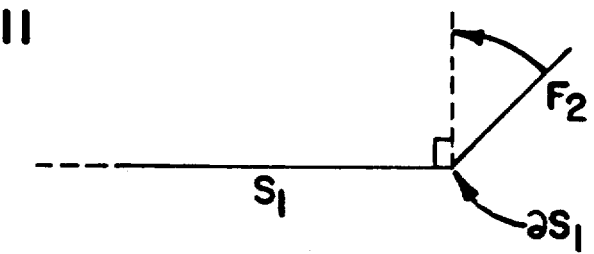
FIGS. 11 and 12 are sketches of the proof of Theorem 2 according to the present invention.
Figure 12:
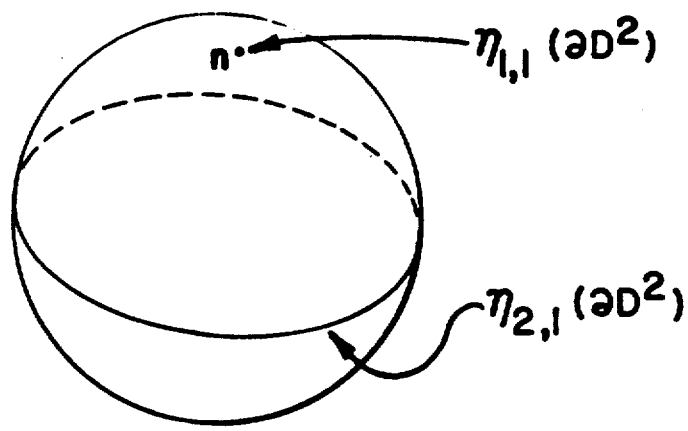

First flatten an small patch in $S_1$. Then shrink $S_1$ through itself (using a coordinate system with center in the flattened patch) to a flat disc in this patch. By a general theorem this isotopy extends to one of $R^3$. Now the angle the flange ($F_2$) makes with $S_2$ may vary, but it must lie either entirely above or entirely below the plane of $S_1$ (assuming the flange has been cut small enough). Then steadily move this angle to 90° at all points of $\partial S_1$ (see FIG. 11). Again this isotopy extends to $R^3$, and the claim is established. For $i=1,2$ and $i\epsilon[0,1]$, define $f_{i,t}:D^2\rightarrow R^3$ by $f_{i,t}(u)=H_t(f_i(u))$. As before, define $f_{i,t}:D^2\rightarrow S^2$ by $\eta_{i,t}(u)=$ unit normal to $f_{i,t}(D^2)$ at $f_{i,t}(u)$. Note that for $u\epsilon\partial D^2,\eta_{1,t}(u)\neq\pm\eta_{2,1}(u)$. (This is because the diffeomorphic images of two surfaces that meet transversely still meet transversely.) Therefore one may define $q_t: \partial D^2\rightarrow US^2$ by $q_t(u)=$ unit vector based at $\eta_{1,t}(u)$ and pointing towards $\eta_{2,t}(u)$. Then $q_t$ is a homotopy from $q=q_0$ to $q_1$. Now examine $q_1$. From FIG. 10 one sees that $\eta_{1,1}(u)$ is constant; picking the upward-pointing normal, $\eta_{1,1}(u)=$ north pole n of $S^2$, for all $u\epsilon D^2$. As u moves once around $\partial D^2$ we see that $\eta_{2,t}$ moves once around the equator of $S^2$ (see FIG. 12, the image of normal maps of $\delta S_1$ and $\delta S_2$ after isotopy.). Thus as u moves around $\partial D^2$, $q_1(u)$ is a vector based at n which rotates once around the circle of unit tangent vectors to $S^2$ at n. From algebraic topology, this map $q_1:\partial D^2\rightarrow US^2$ represents the non-trivial element of $\pi_1(US^2)$. (Recall that $\pi_1(US_2)\approx\pi_1(RP^3)\approx Z/\ 2\ Z$). Therefore $q_1$ is not null-homotopic in $US^2$. But since $q_1$ is homotopic (via $q_t$) to $q_0=q$, this contradicts the fact q is null-homotopic, and it proves Theorem 2.

Figure 5B:
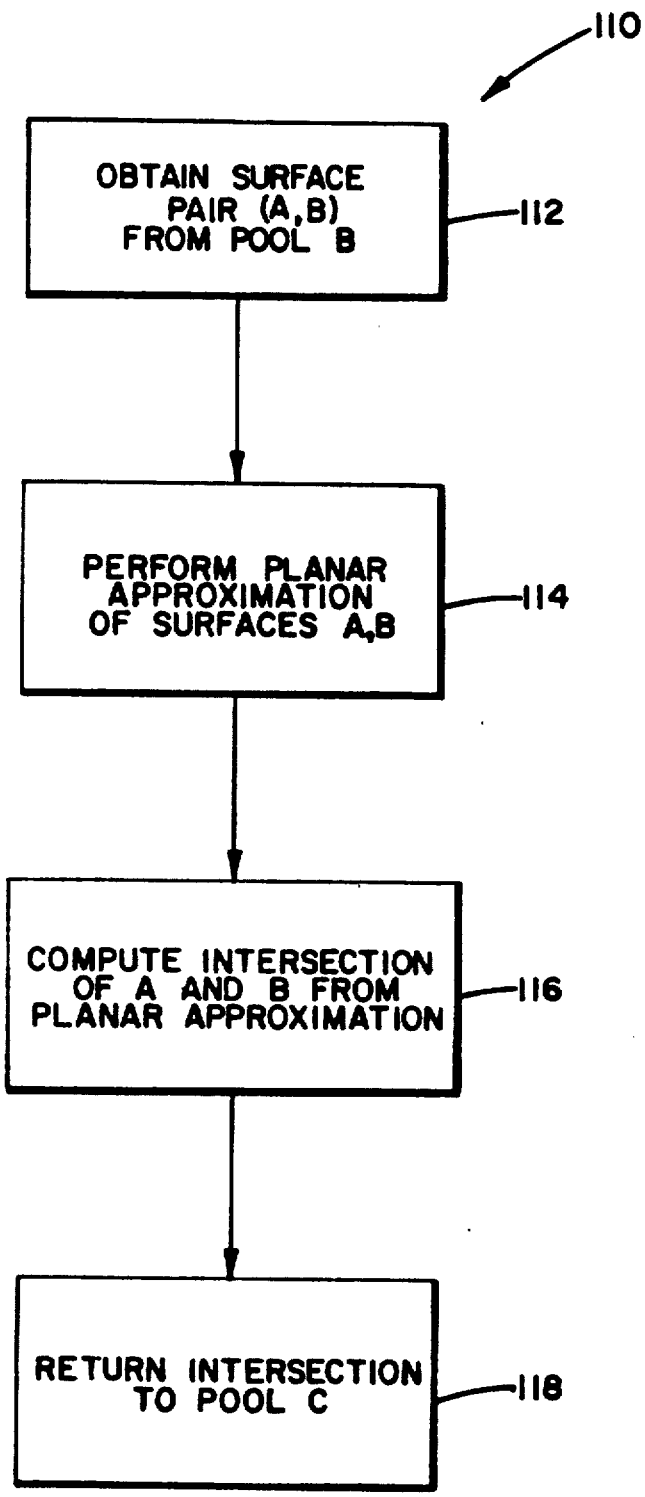
Figure 13:
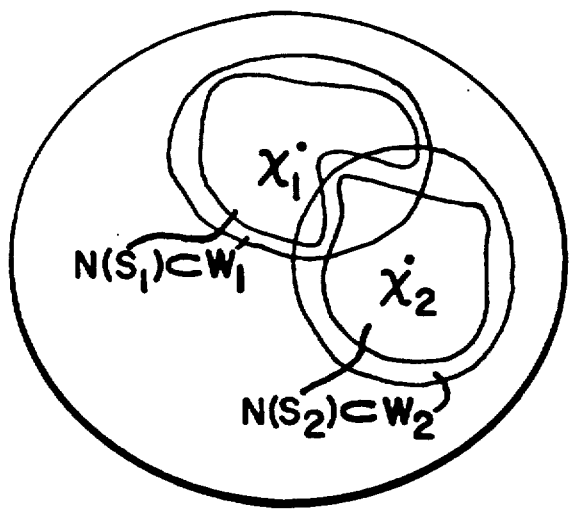
FIG. 13 illustrates Theorems 1 and 2 according to the present invention.

Though Theorem 2 has been proved only for the case $S_1$ and $S_2$ disks, a slightly subtler argument would also hold for $S_1$ and $S_2$ any compact surfaces meeting transversely along their single boundary circle. The fact that Theorem 2 is much stronger is brought out in a situation as in FIG. 13. Since $W_1\cap W_2\phi=0$, Theorem 1 can say nothing about this situation. However, since $N(S_1)\cap N(S_2)=\phi$, Theorem 2 states that the surfaces $S_1$ and $S_2$ do not intersect in a closed curve. Theorem 1 is actually a weaker result than Theorem 2 and can be deduced simply as a corollary. However, both are independently presented since the assumptions in the first theorem allow for a simple geometric proof. The second theorem is a stronger version of Theorem 1 and may be viewed as a generalization of the Mean-value theorem of calculus to surfaces in $R^3$. The main difference lies in the fact that whereas Theorem 1 prescribes conditions on convex sets of $S^2$ containing $N(S_1)$ and $N(S_2)$, Theorem 2 prescribes the same condition directly on the sets $N(S_1)$ and $N(S_2)$. However, the statement of Theorem 1 is all that is needed for the enhancement of the subdivision algorithm as shown in FIGS. 5A and 5B.

The subdivision algorithm, however, requires an additional facility before such an enhancement can be incorporated: the computation of bounds on N(S) for a given surface S. More specifically, given a surface S, an $x\epsilon N(S)$ and a $\delta$ should be computable such that $$D(\bar{x},x)\leq\delta, \quad x\epsilon N(S).$$

Again, as for the min-max boxes used in the generalized subdivision algorithm, an additional constraint has to be placed on the $\bar{x}$ and $\delta$ computation for the subdivision algorithm to converge to arbitrarily fine approximations of the intersection set: Let $\{S_i\}$ be a sequence of patches, such that $S_j$ is a subpatch of $S_{j-1}$ and diam $(S_i)\rightarrow 0$ as $i\rightarrow\infty$. Also $\{\delta_i\}$ be the sequence of computed bounds such that $D(\bar{x}_i, x) \leq \delta_i$, $x \in N(S_i)$ for some sequence of points $\{\bar{x}_i\}$ in $S^2$. Then $\lim_{i \to \infty} \delta_i = 0$.

How these bounds are to be computed for all cases is not known. However, computation of bounds for normals on parametric surfaces is described below. It is also known that these computations for derivatives of B-spline surfaces have been discussed by Carl De Boor, "On Calculating with B-splines," Journal of Approximation Theory, vol. 6, pp. 50–62 (1972).

Using the facility defined above, one can then compute $\bar{x}_1$, $\delta_1$, $\bar{x}_2$ and $\delta_2$ for two surfaces $S_1$ and $S_2$ to be intersected. These parameters can then be used by the following Lemma deduced from Theorem 1:

Lemma 1

$W_1 \cap W_2 = \phi$ if $D(\bar{x}HD\ 1, \bar{x}_2) > \delta_1 + \delta_2$

Proof of Lemma 1

The assertion follows simply from the fact that D obeys triangle-inequality. For if there exists an $x \in W_1 \cap W_2$, then $D(\bar{x}HD\ 1, x) \leq \delta_1$ and $D(\bar{x}_2, x) \leq \delta_2 \to D(\bar{x}_1, \bar{x}_2) \leq \delta_1 + \delta_2$.

Once it has been ascertained that $W_1 \cap W_2 = \phi$, the following deductions can be made:

a) The intersection between the two surfaces if any is a transversal intersection. For, otherwise, there exists an x in $S_1$ and $S_2$ such that $N_x(S_1) = N_x(S_2)$ and hence $W_1 \cap W_2 \neq 0$.

b) The intersection is not a closed curve of intersection. This follows directly from the statement of Theorem 1.

Since there are only two possibilities of transversal intersections and one of them has been eliminated, it can be deduced that the intersection is a curve with a boundary. Each boundary point of such a curve will lie on the boundary of a patch. Hence, if there is an intersection between the surfaces then it is visible at the boundary of the patches.

Figure 14:
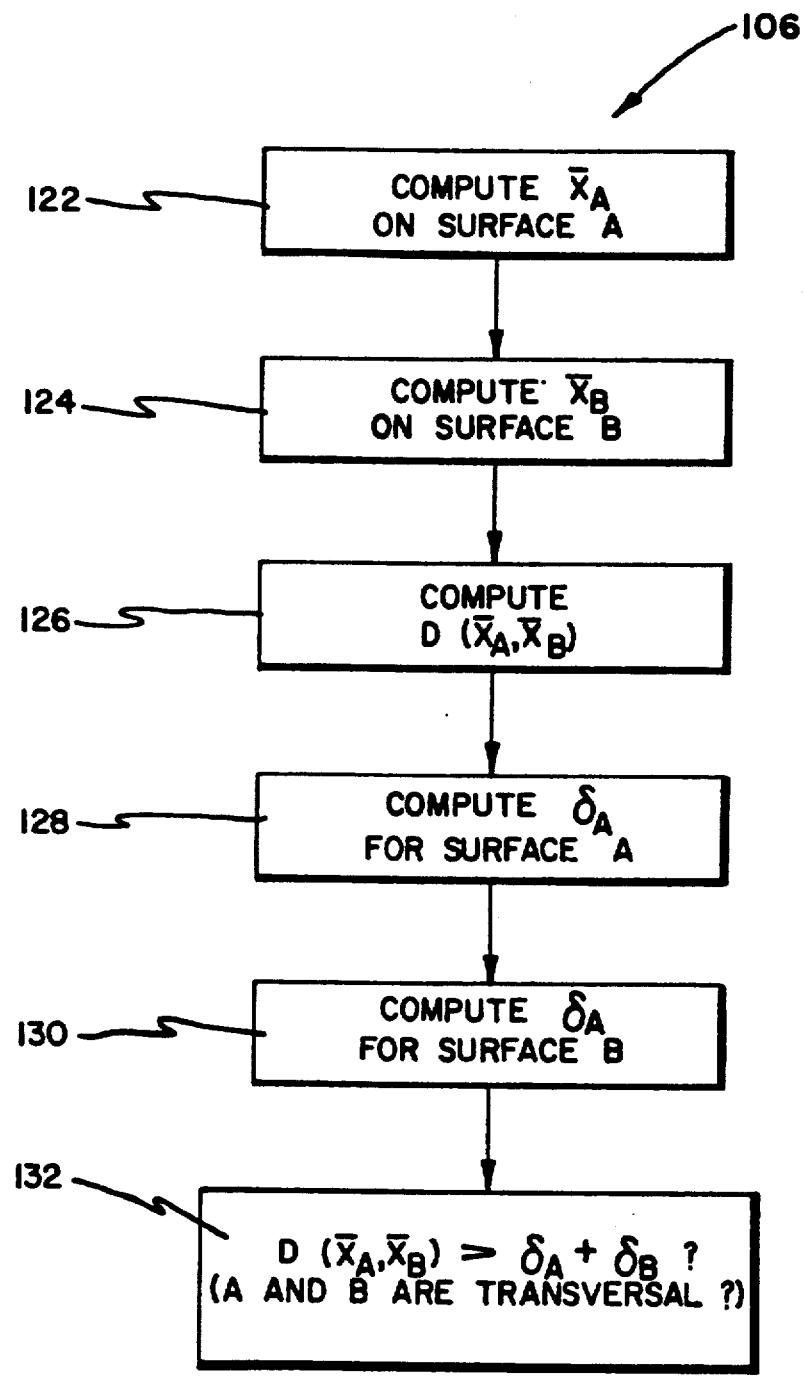
FIG. 14 illustrates the software subroutine of the present invention for determining transversality according to the present invention.

Referring to FIG. 14 there is illustrated the detailed software procedure 120 for performing the transversality check using Lemma 1. Program 120 includes segments 122 and 124 for computing $\bar{X}_A$, $\bar{X}_B$ for surfaces A and B respectively. Segment 126 is provided for computing $D(\bar{X}_A, \bar{X}_B)$. Segments 128 and 130 compute: $\delta_A$ for surface A and $\delta_B$ of surface B, respectively. Finally, segment 132 tests to see if $D(\bar{X}_A, \bar{X}_B) \geq \delta_A + \delta_B$. If the test in segment 132 succeeds, the surfaces are transversal.

Referring to FIG. 5B there is illustrated the detailed software procedure 110 for performing the boundary test which determines whether or not there is actually an intersection. Segment 112 is provided to obtain a pair of surfaces A and B from Pool B shown in FIG. 4A. Pool B contains pairs of surfaces A and B satisfying the flatness criterion specified for the surfaces in segment 54 of FIG. 4A. Segment 114 performs a planar approximation of the surfaces A and B obtained in segment 112. Segment 116 computes the intersection of surfaces A and B from their planar approximations. Segment 118 returns the computed intersection set (which may be a null set) to pool C as shown in FIG. 5A.

The boundary test=true is and only if the ((the boundary of surface A has a non-null intersection with surface B) or (the boundary of surface B has a non-null intersection with surface A)). The computation of the intersection of a surface with the boundary of another surface can be performed to any desired tolerance by prior art subdivision methods as for instance taught by the above referenced paper to Madur and Koparkar (1984), or for instance by Q. S. Peng, "An Algorithm for finding Intersection lines between two B-Spline Surfaces", CAD, vol. 16, No. 4, July (1984), the disclosure of which is hereby incorporated by reference herein.

Peng teaches the following algorithm for finding the intersection lines between two B-spline surfaces:

"The first step is to calculate all the knots on both surfaces, build the comparison box for each of the patches and compare the patches in pairs to see if any two boxes on the two surfaces intersect. The technique of the minimax enclosing box test is used so that we can take full advantage of the cheap division method by simplifying the conquer process. Those patches that cannot be separated from their rivals in the first round are transformed into their corresponding Bezier forms by inserting sufficient multiple knots at both the ends of parametric intervals and are then in a suitable form for further subdivision.

In order to find the intersections between the two surfaces as soon as possible, the depth-first searching method is adopted. We start our process from a transformed patch of one surface (which is referred to as the host surface). After each subdivision, four new subpatches are formed, each of which inherits all its father's rivals and after a series of comparisons each son builds its own rival list. Those subpatches whose boxes do not intersect any box on the other surface will no longer be considered.

Obviously, a quad-tree is the most suitable data structure to be used here with both the subdivision process and the topological relation between adjacent subpatches clearly represented. During the search the foremost son of the host tree is always dealt with first. Either it or one of its rivals may be divided depending on the size of their corresponding convex hulls. The reason for the adaptive divisions on both subpatches of the two surfaces is obvious: The convex hulls of the two patches can be separated more quickly than otherwise if the two patches have no intersection at all.

When both the thickness of the convex hulls of a pair of subpatches are less than a given tolerance, they can be treated as two planar quadrilaterals and a direct intersection test can proceed. If they do not cross each other, then the host tree is searched again. Otherwise, a piece of intersection line of the two surfaces is declared and the next pair of subpatches of the two surfaces that will form the following portion of the intersection line are found easily by using the adjacency relation between the subpatches. The process of 'divide-intersect-stretch-divide again' is repeatedly carried on until one end of the intersection line is reached. Control is then returned to the original portion and the intersection line is traced in the other direction.

Figure 15:
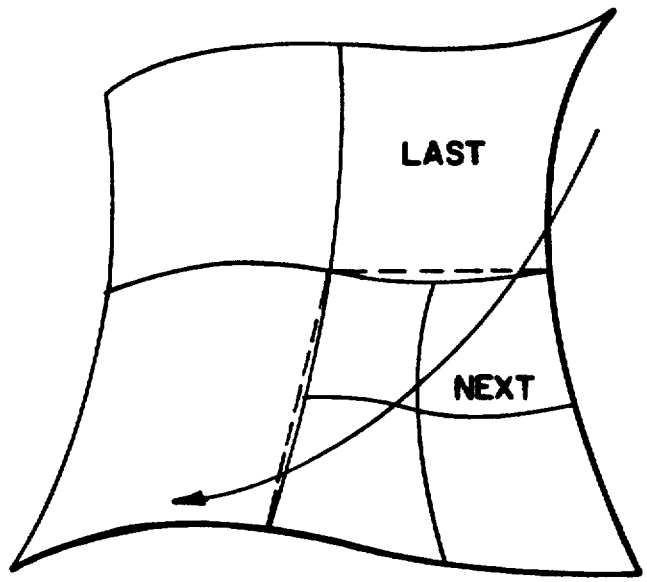
FIGS. 15 and 16 illustrate an example method for finding the intersection between two B-spline surfaces as set forth in the specification according to the present invention.

It should be mentioned that when the intersection line stretches, the two adjacent quadrilaterals may not share common edges in the case where their corresponding vertices are related to different parametric values (see FIG. 15). This may happen when the two adjacent subpatches result from different levels of subdivision. However, according to the termination condition the distance from any point on either edge to the surface is less than the given tolerance. We can modify the next quadrilateral so that it will share a common edge with the last one. By this approach, an intersection line will always appear in a continuous, consecutive form.

Figure 16:
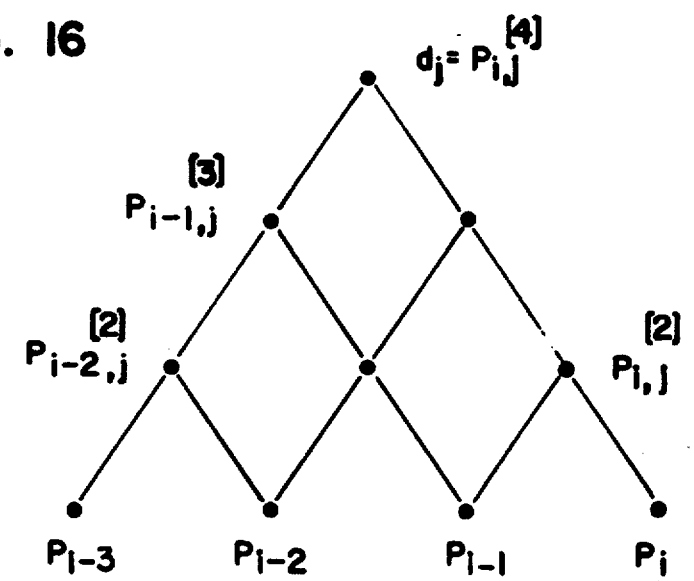

In order to transform a B-spline patch into its corresponding Bezier form, then multiple knots should be inserted at both ends of the parametric interval, thus forming a new polygon. FIG. 16 shows the result when the four new vertices are evaluated one by one, each taking eighteen multiplications/divisions by implementing the following formula six times:

$$d(j) = \sum_{i=\mu-k+r}^{\mu} P_{i,j}^{[r]} a_{i,k-r+1}(j)(t_\mu \leq \tau_j < \tau_{\mu+1})$$

where $$P_{i,j}^{[1]} = P_i,$$

$$P_{i,j}^{[r+1]} = [(\tau_{j+k-r} - t_i)P_{i,j}^{[r]} + (t_{i+k-r} - \tau_{j+k-r})P_{i-1,j}^{[r]}]/(t_{i+k-r} - t_i)$$

Thus taking $r=k$, we have $$d(j) = P_{\mu,j}^{[k]} a_{\mu,1}(j) = P_{\mu,j}^{[k]}$$

The search of the remaining convex hulls is continued until each has been checked. In this way no intersection line between the two surfaces can be missed."

Figure 1:
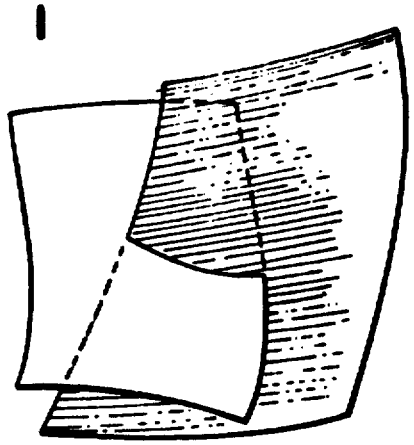
FIG. 1 and 2 are perspective views of example surface intersections.
Figure 2:
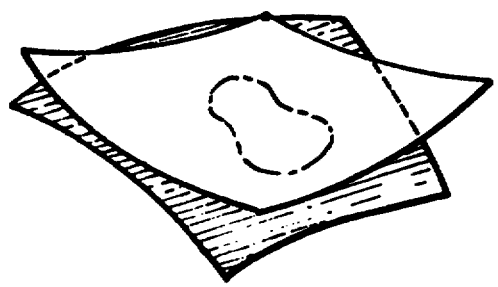

For intersections of the type shown in FIG. 2, it is clear that the check introduced will not be satisfied initially. The subdivision process will hence continue until the check executed for the subpatches succeeds. At this point, the intersections of the subpatches will be in arcs rather than closed curves. Such areas, when pieced together, will give the closed curve of intersection of the original patches. Other intersections, for example a one point intersection, can never be reduced to a set of transversal intersections by subdivision. Accordingly, such intersection are approximated to working tolerances deemed necessary to ensure reliability. For further information on the subdivision algorithm and technique, see Sinha, P. et al., "Exploiting Topological and Geometric Properties for Selective Subdivision", Symposium on Computational Geometry, June 5-7, 1985, Baltimore, Md., the entire disclosure of which is hereby incorporated by reference herein.

The actual computation of the intersection curve is a more difficult problem than the detection problem since the intersection set may contain many components. In fact, the intersections are not necessarily nice even if the faces are transversal since the boundary of one face may be non-transversal to the other face. The details of how these cases are to be handled are the subject of the current research. However, it may be noted that whatever the intersection computation algorithm, the detection algorithm above will significantly reduce computations required by identifying areas where intersection does occur. For a further discussion of intersections, see Sinha, P., Ph.D. thesis, "Surface-surface Intersection for Geometric Modeling," Graduate School, Cornell University, Ithaca, N.Y., June 1, 1986, the entire disclosure of which is hereby incorporated by reference herein.

The implementation of the algorithm of the present invention for a general surface-surface intersection problem assures 3 computational facilities of the surfaces:

1. Computation of the flatness of a patch;
2. Computation of Min-Max box enclosing a surface patch; and
3. Bounds on the set of normals.

It is shown below that these three facilities can be provided for at least one class of surfaces: those defined parametrically by real-analytical functions with radii of convergence large enough to include the domain of the surface patches.

Techniques for implementing the first two facilities have been discussed in publications such as Lane, J. M. and Carpenter, L., "A Generalized Scan Line Algorithm for the Computer Display of Parametrically Defined Surfaces", Computer Graphics and Image Processing, vol. 11, pp. 290-297, (1979).

The preferred techniques for implementing the third facility are described below:

Given a patch S defined parametrically as $$S = f(\theta,\phi) = (x(\theta,\phi), y(\theta,\phi), z(\theta,\phi)), (\theta,\phi) \in D$$

where x,y,z are real-valued functions and D is the domain of the patch, choose a point $$\bar{x} = f(\bar{\theta}, \bar{\phi}) \text{ in } S.$$

A bound for normals over the patch S is defined as a real number $\epsilon$ such that $$\epsilon \geq D(N_x(S), N_{\bar{x}}(S)) \quad x \in S$$

To compute $\epsilon$, first we need to compute bounds on the isoparametric tangents for S from their value at $\bar{x}$. This is done using Taylor series expansion and interval arithmetic. For example, for the x-component of the tangent $f_\theta(\theta,\phi)$ we get (note: $x_\theta$ means $$\frac{\partial x}{\partial \theta}).$$

$$\delta(x_\theta) = ||x_\theta(\theta,\phi) - x_\theta(\bar{\theta},\bar{\phi})||$$

$$= \left|\left|\frac{\partial x}{\partial \theta}\right|\right| ||\theta - \bar{\theta}|| + \left|\left|\frac{\partial x}{\partial \phi}\right|\right| ||\phi - \bar{\phi}||.$$

$||\theta - \bar{\theta}||$ and $||\phi - \bar{\phi}||$ are known for the patch from its domain D while $$\left|\left|\frac{\partial x_\theta}{\partial \theta}\right|\right|$$

$$= ||x_{\theta\theta}|| \text{ and}$$

$$\left|\left|\frac{\partial x_\theta}{\partial \phi}\right|\right|$$

$$= ||x_{\theta\phi}||$$ are computed using interval arithmetic on symbolic expression for $x_{\theta\theta}$ and $x_{\theta\phi}$ derivable from $f(\theta,\phi)$. Similarly $\delta(y_\theta)$ and $\delta(z_\theta)$ can be computed. Then maximum vector variation in $f_\theta(\theta,\phi)$ is given by $$\delta(f_\theta) = \sqrt{\delta(x_\theta)^2 + \delta(y_\theta)^2 + \delta(z_\theta)^2}$$

The distance of any $f_\theta(\theta,\phi)$ from $f_\theta(\bar{\theta}, \bar{\phi})$ (see defn. of D(p,q) defined for statement of Theorem 1) is given by $$D(f_\theta(\theta,\phi),f_\theta(\theta,\phi)) = \frac{\delta(f_\theta)}{|f_\theta|}$$

Call this $\epsilon_\theta$.

Similarly we can compute $\epsilon_\phi = D(f_\phi(\theta,\phi), f_\phi(\theta,\phi))$ after having computed $\delta(x_\phi)$, $\delta(y_\phi)$ and $\delta(z_\phi)$.

The maximum variation of surface normals to patch S from $N_{\bar{x}}(S)$ is derivable from $\epsilon_\theta$ and $\epsilon_\phi$ using the following result:

If w is a vector denoting the maximum variation of $N_x(S)$ over S from $N_{\bar{x}}(S)$, i.e., $$D(w, N_x(S)) \geq D(N_x(S), N_x(S)) \quad x \in S$$

then w satisfied $$|<w, n_\theta>| = \epsilon_\theta$$

$$|<w, n_\phi>| = \epsilon_\phi$$

$$\|w\|_2 = 1$$

where $$n_\theta = f_\theta(\bar{\theta}, \bar{\phi})$$

$$n_\phi = f_\phi(\bar{\theta}, \bar{\phi})$$

$< >$ denote inner product, and $\epsilon_\theta$, $\epsilon_\phi$ are defined above.

Computationally, this can be reduced to solving 4 systems:

$$<w, n_\theta> \neq \epsilon_\theta$$

$$<w, n_\phi> \neq \epsilon_\phi$$

$$\|w\|_2 = 1$$

The first two equations are linear and can be used to reduce $\|w\|_2$ to a quadratic in one unknown. Hence, eight solutions for w are obtained. The one which minimizes $<w, n_\theta \times n_\phi>$ is one which defines the desired bound on surface-normals by $$\epsilon = \max_{n \in S} D(N_x(S), N_{\bar{x}}(S)) \leq \sqrt{1 - <w, n_\theta \times n_\phi>^2}.$$

The above-described techniques are preferred for computing bounds in the case of parametrically defined surfaces. For a further discussion of this and other aspects of the computations required for the present invention, see the above-identified thesis by P. Sinha.

The following material is provided as a more detailed discussion of the methods used to compute the bounds on the tangent spaces of surfaces.

Bounds on Tangent Space Variations

For surface in three dimensional space, the tangent space is two dimensional. The variation of tangent spaces can be related to the variation of the surface normals. The definition of variation of one-dimensional subspaces is presented and extended to include variations of two-dimensional spaces in $R^3$. Recall that 1. The normal map $N: S \rightarrow R^3$ assigns to each point x in a surface S, the unit normal vector $N_x(S)$ to the surface S at the point x; the map actually goes to the unit sphere $S^2$, i.e., $N: S \rightarrow S^2 \subset R^3$.

2. The distance function is given by $D: S^2 \times S^2 \rightarrow R^1$ such that $D(p,q) = (1 - <p,q>^2)^{\frac{1}{2}}$, where p and q denote points on $S^2$ as well as vectors from the center of $S^2$ to the points. This function is simply a vector version of the distance function defined for vector subspaces. See Bjork et al., "Numerical Methods for Computing Angles between subspaces", Mathematics of Computation, vol. 27, No. 123, July (1973). In fact, if P and Q are 1-dimensional vector subspaces of $R^3$ containing p and q respectively, then $D(p,q) = $ distance $(P,Q)$.

The distance function is actually defined for any pair of equidimensional linear subspaces and the definition of function D used above is simply a special result for one-dimensional case. A convenient specialization of the result can also be obtained for the two-dimensional case:

Definition 2.1

Let F and G be two planes in $R^3$. Let $n_F$ and $n_G$ be the normal vectors to F and G respectively. Then the distance between F and G is defined as the distance between the respective normal vectors.

Hence, distances for 1 and 2 dimensional subspaces of $R^3$ can be defined in terms of the function D defined above. Wherever there is no ambiguity, the function $D(P,Q)$ will therefore be used to denote distances between planes, one-dimensional subspaces, or vectors given by P and Q. Using this setup, a more general formulation of the problem of computing the variation of surface normals is presented.

General Formulation

Assume that F and G are two planes in $R^3$. Let $$F = \{T | D(F,T) \leq \epsilon_F\}, \text{ and}$$

$$G = \{T | D(G,T) \leq \epsilon_G\},$$

where $\epsilon_F$ and $\epsilon_G$ are non-negative real numbers. Then the following maximization problem computes the perturbation of the intersection of F with G due to perturbations in F and G themselves:

$$\max_{F \in F, G \in G} D(F \cap G, F \cap G)$$

The problem of finding the maximum perturbation of intersection of perturbed linear subspaces can be easily generalized for higher-dimensional subspaces; however, research available on this subject deals with small perturbations only (see Golub, et al., *Matrix Computations*, The Johns Hopkins Univ. Press, Baltimore, Md. (1983)). In this respect, the problem is similar to that of finding bounding boxes for surfaces where results are known for surface variations in a small neighborhood of a point. The general problem defined above is expected to be a non-linear optimization problem.

For the case of planes in $R^3$, as the problem is defined, certain geometric constructions can be used to reduce the problem to solving a quadratic equation. First assume that $\epsilon_F + \epsilon_G < D(F,G)$ in the formulation above. This assumption is not difficult to satisfy and makes physical sense in the problems that we will apply it to. For now, we note that this guarantees that the intersection of the two planes will always be a one-dimensional subspace. If this is not the case then our definition will no longer apply since the spaces will not be equidimensional.

In order to simplify the statement of the problem for geometric construction, we present the following lemma.

Lemma 2.1

Let $w \in F'$, $F' \in F$ and $\|w\|_2 = 1$. Then $$|\langle w, n_F \rangle| \leq \epsilon_F.$$

Proof of Lemma 2.1

Figure 17:
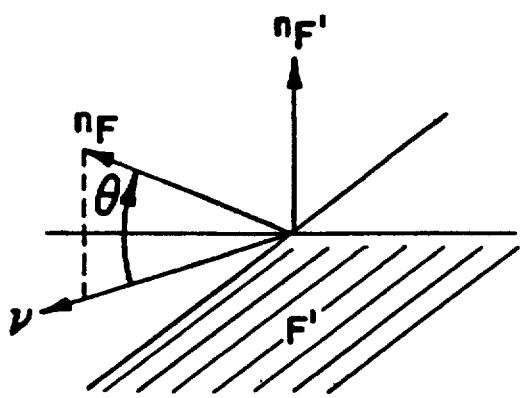
FIGS. 17, 18 and 19 are illustration of the statement of the proof of Lemma 2.1 set forth in the specification according to the present invention.

Let P be the plane defined by the normal vectors $n_F$ and $n_{F'}$. Let v be a unit vector along the intersection of the planes P and F'. Then (see FIG. 17)

$$\begin{aligned}|\langle n_F, v \rangle| &= |\cos\theta| \\ &= (1 - \sin^2\theta)^{\frac{1}{2}} \\ &= (1 - \cos^2(90 - \theta))^{\frac{1}{2}} \\ &= (1 - \langle n_F, n_{F'} \rangle^2)^{\frac{1}{2}} \\ &= D(n_F, n_{F'}).\end{aligned}$$

But $D(n_F, n_{F'}) \leq \epsilon_F$. Hence, $|\langle n_F, v \rangle| \leq \epsilon_F$. By Lemma 2.2 (given below), $D(w, n_F) \geq D(v, n_F)$ or, $$(1 - \langle n_F, w \rangle^2)^{\frac{1}{2}} \geq (1 - \langle n_F, v \rangle^2)^{\frac{1}{2}}, \text{ or }$$

$$|\langle w, n_F \rangle| \leq |\langle v, n_F \rangle|.$$

Hence, $|\langle w, n_F \rangle| \leq \epsilon_F$.

Now if $w \in F' \cap G'$ then $$|\langle w, n_F \rangle| \leq \epsilon_F,$$

$$|\langle w, n_G \rangle| \leq \epsilon_G$$

Hence, the original problem can be reduced to $$\min |(w, n_F \times n_G)|$$

subject to $$|\langle w, n_F \rangle| > \epsilon_F,$$

$$|\langle w, n_G \rangle| \leq \epsilon_G,$$

$$\|w\|_2 = 1.$$

Figure 18:
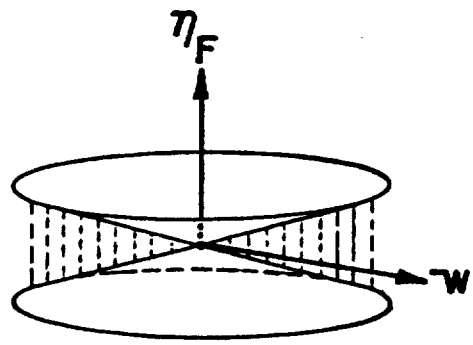
Figure 19:
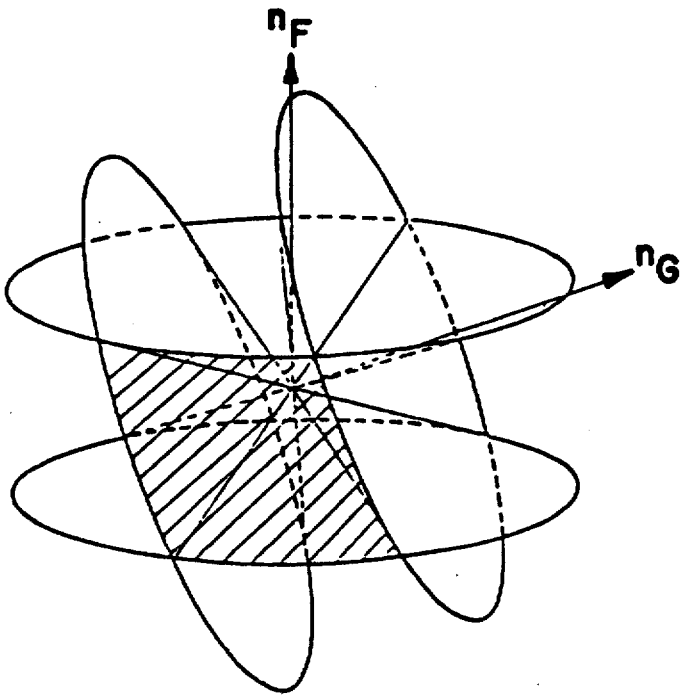

The first and second conditions in the above three constraints define the extend to which F' and G' can be tilted with respect to F and G respectively. FIG. 18 shows the double cone defined by the first constraint: w lies outside of the cone in the region shown shaded in the figure. The two cones together (see FIG. 19) define a feasible region for w that is the intersection of the regions for the individual cones. In Lemma 2.3, it will be shown that the feasible region is actually two disconnected regions. The following theorem leads to a computational method to solve the minimization problem by identifying where in the feasible regions is the minima for $|\langle w, (n_F = n_G) \rangle|$ achieved.

Lemma 2.2

Let v be a unit vector in $R^3$ and P a plane through the origin with unit normal vector w. Define Q to be a plane containing all vectors in the subspace spanned by v and w. (This plane may not be unique if $v = \pm w$.) Let v be a unit vector in $P \cap Q$. Then, for any unit vector u in P, $$D(v, v) \leq D(u, V).$$

Proof of Lemma 2.2

Drop a perpendicular from v to the plane P. (Again, notation such as v will be used to denote both a point as well as the vector from the origin to the point.) Let p be the point where it hits the plane. Define v to be the unit vector directed along the vector p. The $v \in P$ and $v \in Q$. Since v is a nit vector, $D(\,,v) = |(p - v)|$. This follows from the fact that the function D actually maps a pair of unit vectors to the sin of the angle between the subspaces containing them. (It does not matter which angle is chosen). Now let u be any other vector in P such that $u \neq \pm v$. Drop a perpendicular from point v to the line in P containing u. Let it hit the line in point x. Then, $|(p - v)| \leq |(x - x)|$ because $(p - v)$ is orthogonal to $(x - p)$. Also $D(u, v) = |(u, v)| = |(x - v)|$ Hence, $D(vv) = |(p - v)| \leq |(x - v)| = (D(u, v)).$

Theorem 2.1

Assume $\epsilon_F + \epsilon_G < D(n_F, n_G)$. Then the minimum $$\min |\langle w, (n_F \times n_G) \rangle|$$

subject to $$|\langle w, n_F \rangle| \leq \epsilon_F,$$

$$|\langle w, n_G \rangle| \leq \epsilon_G,$$

$$\|w\|_2 = 1$$

is achieved for some w that $|\langle w, n_F \rangle| = \epsilon_F$ and $|\langle w, n_G \rangle| = \epsilon_G$.

Proof of Theorem 2.1

Figure 20:
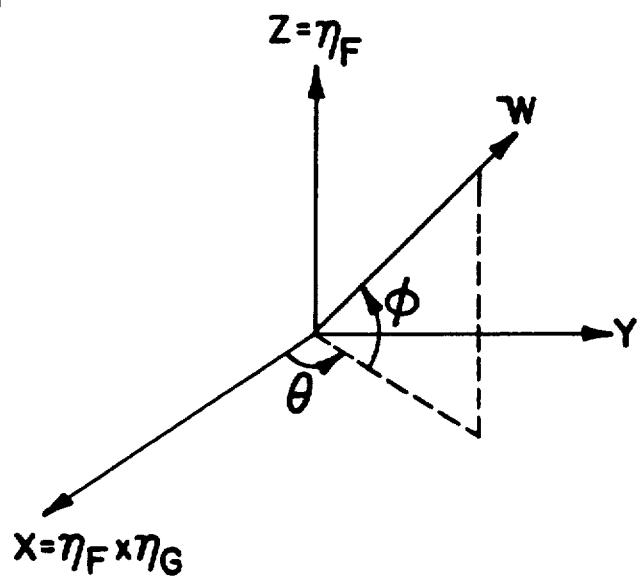
FIG. 20 is an illustration of the statement of the proof of Theorem 2.1 set forth in the specification according to the present invention.

Define a right-handed coordinate system with the x-axis and $n_F \times n_G$, the z-axis as $n_F$ and the y-axis as $z \times x$. In this coordinate system, $n_G$ can be expressed as $$0i + aj + bk$$

for some a and b in R. Express w in polar coordinates with $\theta$ and $\phi$ as shown in FIG. 20. Then
ti $w = \cos\phi\cos\theta i + \cos\phi\sin\theta j + \sin\phi k$ Then the first two constraints in the problem translate to $$|\langle w, n_F \rangle| = |\sin\phi| \leq \epsilon_F, \text{ and}$$

$$|\langle w, n_G <| = |a \cos\phi\sin\theta + b \sin\theta| \leq \epsilon_G.$$

The third constraint is satisfied by definition of the vector w. It may be noted here that if z axis were chosen along $n_G$ then a similar set of constraints would be obtained with $n_F$ replaced by $n_G$. The first constraint with $z = n_F$ is then equivalent to second constraint for $z = n_G$ and vice-versa. This follows simply from the physical interpretation of the constraints.

The minimization function translates to $$|\langle w, (n_F \times n_G) \rangle| = |\cos\phi\cos\theta|.$$

Now assume $|\langle w, n_F \rangle| \leq \epsilon_F$. Then $|\phi| \uparrow \rightarrow |\cos\phi\cos\theta| \downarrow$. ($\uparrow$ and $\downarrow$ denote increase and decrease respectively.) This is because $|\phi| \leq 90°$ is always true. Hence $|>w,(n_F \times n_G)>| \downarrow$ as $|\phi| \uparrow$. Clearly $|\phi|$ can be increased until either the first or the second constraint achieves equality. Without loss of generality assume that $|<w,n_F>|=\epsilon_F$. If equality were achieved in the second constraint instead, then we could flip the system to $z=n_G$ where it would be the first constraint that would achieve equality. In either case $\theta$ is free to vary without violating the first constraint since $\phi$ is constant. If $|\theta|<90°$, then $$|\theta| \uparrow \rightarrow |\cos \theta| \downarrow \rightarrow |<w,(n_F \times n_G)>| \uparrow.$$

If $|\theta|>90°$, then the same result is achieved by $|180-\theta| \uparrow$. The next lemma proves that $\theta=90°$ is infeasible under the assumption that $\epsilon_F + \epsilon_G < D(n_F,n_G)$ so that for a given feasible region $|\theta|<90°$ or $|180-\theta|<90°$ is true.

Lemma 2.3

If $\epsilon_F + \epsilon_G < D(n_F,n_G)$ then $|\theta=90°|$ is infeasible.

Proof of Lemma 2.3

We show here that if such a w, i.e., corresponding to $\theta=90°$ is feasible than there exists a plane T such that $D(T,F) \leq \epsilon_F$ and $D(T,G) \leq \epsilon_G$. Then, since D obeys the triangle inequality, the condition $\epsilon_F + \epsilon_G$) is violated. We assert that the plane spanned by w and $n_F \times n_G$ is such a plane T. Note that w lies in the plane spanned by $n_F$ and $n_G$ and is hence orthogonal to $n_F = n_G$. Since $n_F$ and w are both normal to $n_F = n_G$, $n_T$ is contained in the plane spanned by $n_F$ and w. Then, by arguments similar to those used in lemma 2.1, we get $D(T,F) \leq \epsilon_F$. Similarly, $D(T,G) \leq \epsilon_G$. This completes the proof.

Computationally, this theorem implies that w can be computed by either looking at the intersections of the two cones (see FIG. 19), or by solving the system of three equations obtained from the constraints by replacing the inequality signs with equalities. Further, the absolute value signs may be removed by taking care of all possible cases of signs. Four cases are hence obtained by using $\pm E_F$ and $\pm E_G$ in the first two constraints. An additional 2 cases are obtained for each earlier case by taking $n_G = n_F$ to be the $\pm$x-axis in the computations. This will yield 8 solutions: one for each of the four corners of two feasible regions. Computationally, only two need be solved because of symmetry.

Two of the equations obtained are linear and one quadratic. The linear equations can be used to substitute into the quadratic one so that a quadractic equation in one variable is obtained. Back substitution will then result in the possible w vectors.

Having obtained a computational method to solve this problem, it will now be demonstrated how two other problems be reduced to this one.

Variation of Surface Normals

Computation of the bounds on the variations of surface-normals over a face P can be formulated as the computation of a point $x \in P$ and an $\epsilon$ such that $$D(N_x(P),N_{\bar{x}}(P)) \leq \epsilon \quad x \in P.$$

We assume, as before, that the face has an underlying surface that is regular. We will reduce the problem of computing the surface-normal variations by suitably defining the planes F and G and the sets F and G for the problem stated above.

Let $\theta - \phi$ be the parameters of the surface defined by $$f(\theta,\phi)=(x(\theta,\phi),y(\theta,\phi),z(\theta,\phi)).$$

Then define isoparametric tangents at any point $f(\theta,\phi)$ on the face by $$f_\theta(\theta,\phi) = \left(\frac{\partial x}{\partial \theta}, \frac{\partial y}{\partial \theta}, \frac{\partial z}{\partial \theta}\right)\bigg|_{(\theta,\phi)},$$

$$f_\phi(\theta,\phi) = \left(\frac{\partial x}{\partial \phi}, \frac{\partial y}{\partial \phi}, \frac{\partial z}{\partial \phi}\right)\bigg|_{(\theta,\phi)}.$$

Define $\bar{x}$ to be a point on the surface with parameters $(\bar{\theta},\bar{\phi})$. We now define the planes F and G, and the sets F and G. Let $N(v)$ be the plane normal to the vector v. Then define $$F = N(f_\theta(\bar{\theta},\bar{\phi})),$$

$$G = N(f_\phi(\bar{\theta},\bar{\phi})),$$

$$F = \{N(v) | D(v,f_\theta(\bar{\theta},\bar{\phi})) \leq \epsilon_F\}, \text{ and}$$

$$G = \{N(v) | D(v,f_\phi(\bar{\theta},\bar{\phi})) \leq \epsilon_G\}.$$

Figure 21:
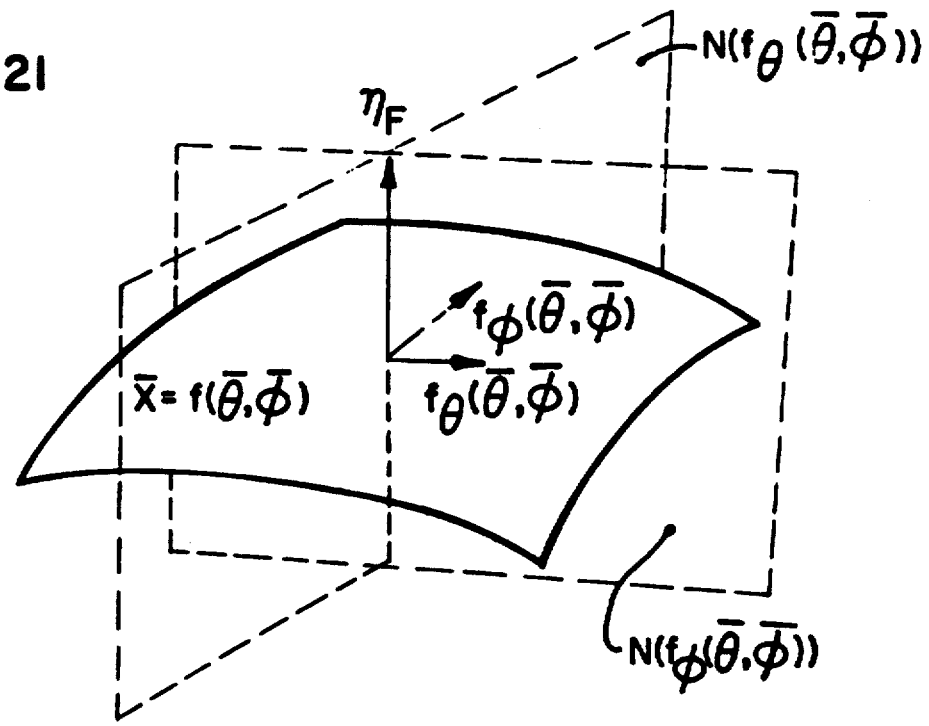
FIG. 21 is an illustration of the computation of the bounds on the variations of surface normals as set forth in the specification according to the present invention.

Then $F \cap G$ is nothing but the surface normal at the point $(\theta,\phi)$ (see FIG. 21). Also, if $F' \epsilon_F$ and $G' \epsilon G$ define the $N(f_\theta(\theta',\phi'))$ and $N(f_\phi(\theta',\phi'))$ at some point $f(\theta',\phi')$ in P then $D(F \cap G, F' \cap G')$ is the distance of the surface normal at $f(\theta',\phi')$ from $f(\theta,\phi)$. Hence, $$\epsilon = \max_{F \in F, G \in G} D(F \cap G, F' \cap G').$$

Now $\epsilon_F$ and $\epsilon_G$ define the variations in the sets F and G. These are same as the variations of $f_\theta(\theta,\phi)$ and $f_\phi(\theta,\phi)$ since these are the surface normals to the planes in F and G. Hence, surface-normal variations can be computed if $\epsilon_F$ and $\epsilon_G$ can be computed. To compute these, once again the Taylor series expansion and the interval bound on the second derivative can be used: Let $$x_\theta(\theta,\phi) = \frac{\partial x}{\partial \theta}\bigg|_{(\theta,\phi)}$$

Then, using Taylor series expansion about $(\bar{\theta},\bar{\phi})$, $$x_\theta(\theta,\phi) = x_\theta(\bar{\theta},\bar{\phi}) + \frac{\partial x_\theta}{\partial \theta}\bigg|_{(\theta',\phi')}(\theta - \bar{\theta}) + \frac{\partial x_\theta}{\partial \phi}\bigg|_{(\theta',\phi')}(\phi - \bar{\phi}).$$

where $(\theta',\phi')$ are the parameters of some point along the line joining $(\theta,\phi)$ and $(\bar{\theta},\bar{\phi})$. Hence, the maximum variation in x-coefficient of $f_\theta$ is given by $$\delta(x_\theta) = ||x_\theta(\theta,\phi) - x_\theta(\bar{\theta},\bar{\phi})|| \leq$$

$$\left\|\frac{\partial x_\theta}{\partial \theta}\right\| ||\theta - \bar{\theta}|| + \left\|\frac{\partial x_\theta}{\partial \phi}\right\| ||(\phi - \bar{\phi})||.$$

Now $\partial x_\theta/\partial \theta$ is nothing but $\partial^2 x_\theta/\partial \theta^2$ and $\partial x_\theta/\partial \phi = \partial^2 x_\theta/\partial \theta \partial \phi$. But bounds on these are known using interval arithmetic methods and flatness of faces. Also the $||\phi - \bar{\phi}||$ and $||\theta - \bar{\theta}||$ are known because the preimage of the face is triangle. Hence, $\delta(x_\theta)$ can be computed.

Figure 22:
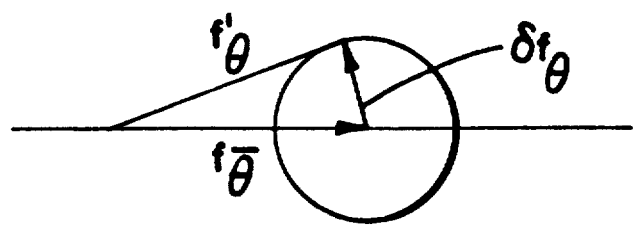
FIG. 22 is an illustration of the computation of distance using an error vector as set forth in the specification according to the present invention.

Similar to $\delta(x_\theta)$ we can compute $\delta(y_\theta)$, $\delta(z_\theta)$, $\delta(x_\phi)$, $\delta(y_\phi)$ and $\delta(z_\phi)$. Then the maximum error in $f_\theta$ over the face P is given by (see FIG. 22)

$$\delta(f_\theta) = (\delta(x_\theta)^2 + \delta(y_\theta)^2 + \delta(z_\theta)^2)^{\frac{1}{2}}.$$

Hence, $$\max_{(\theta,\phi)\in D} D(f_\theta(\theta,\phi), f_\theta(\theta,\phi)) \leq \frac{\delta(f_\theta)}{|f_\theta|} = \epsilon_F$$

Where D is the preimage of face P. Similarly, $\epsilon_G$ can be computed from $\delta(x_\phi)$, $\delta(y_\phi)$ and $\delta(z_\phi)$.

Tangent Space Variation of Intersection Edge

Given that the intersection set of two faces $P_1$ and $P_2$ is an edge, it is desirable to know also how much the edge tangent vary from datum. Computation of bounds on its tangent space is now demonstrated. The variation is defined in terms of vector $\bar{v}$ and an $\epsilon_E$ so that if v is the tangent at any point on the edge of intersection then $$D(v,v) \leq \epsilon_E.$$

This problem can be reduced to the problem defined and solved in the section above on the General Formulation. In fact, the definition of this is almost exactly the one of the original problem:

Let $T_x(P)$ denote the tangent plane for surface P at some $x \in P$ and let $P_1$ and $P_2$ be two intersecting faces. Then define $$F = \{T_x(P_1) | x \in P_1 \cap P_2\}$$

and $$G = \{T_x(P_2) | x \in P_1 \cap P_2\}.$$

Let F and G be the tangent planes for some $\bar{x} \in P_1$ and $\bar{y} \in P_2$ respectively. Then, from discussion in last section, $\epsilon_F$ and $\epsilon_G$ that characterize F and G are known. Hence, the problem is reduced to the general problem solved earlier.

Thus flatness and variation of surface-normal vectors can be computed for the intersecting surfaces and for the edge of intersection.

For a further discussion of this and other aspects of the computation required for the present invention see the above-identified thesis by P. Sinha.

Figure 23:
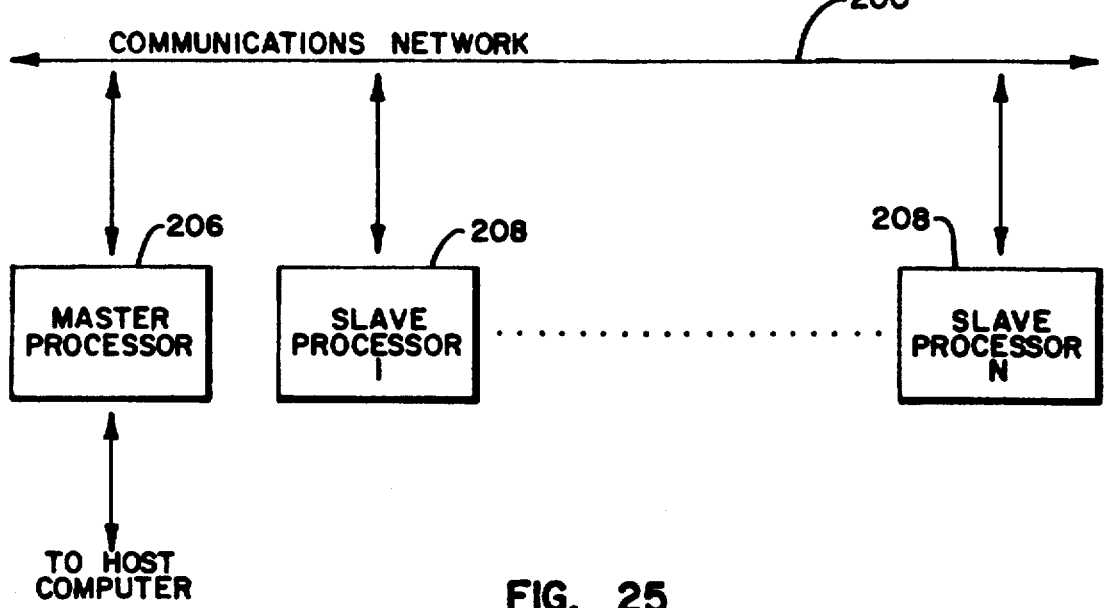
FIGS. 23, 24 and 25 illustrate the parallel processing system according to the present invention.
Figure 25:
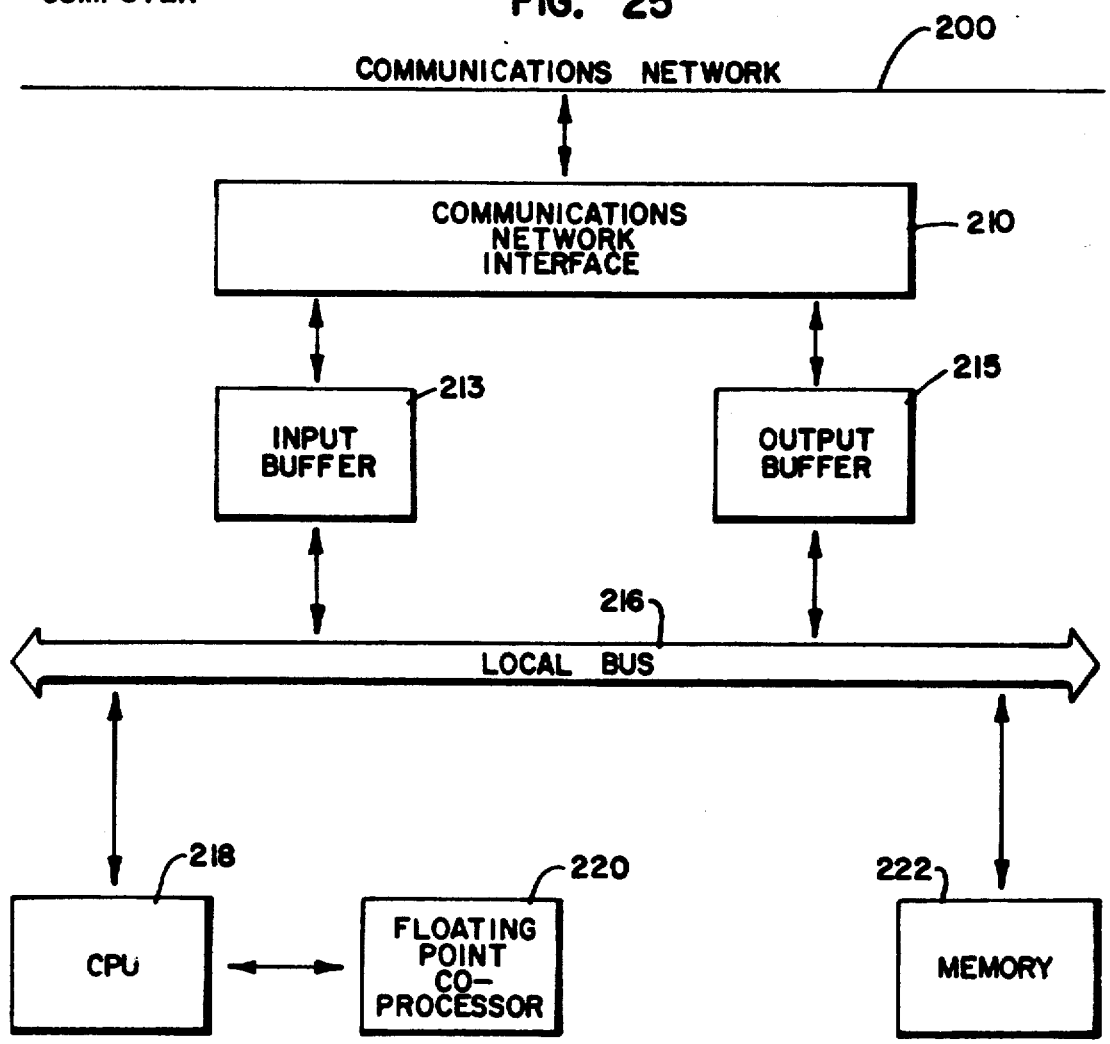
Figure 24:
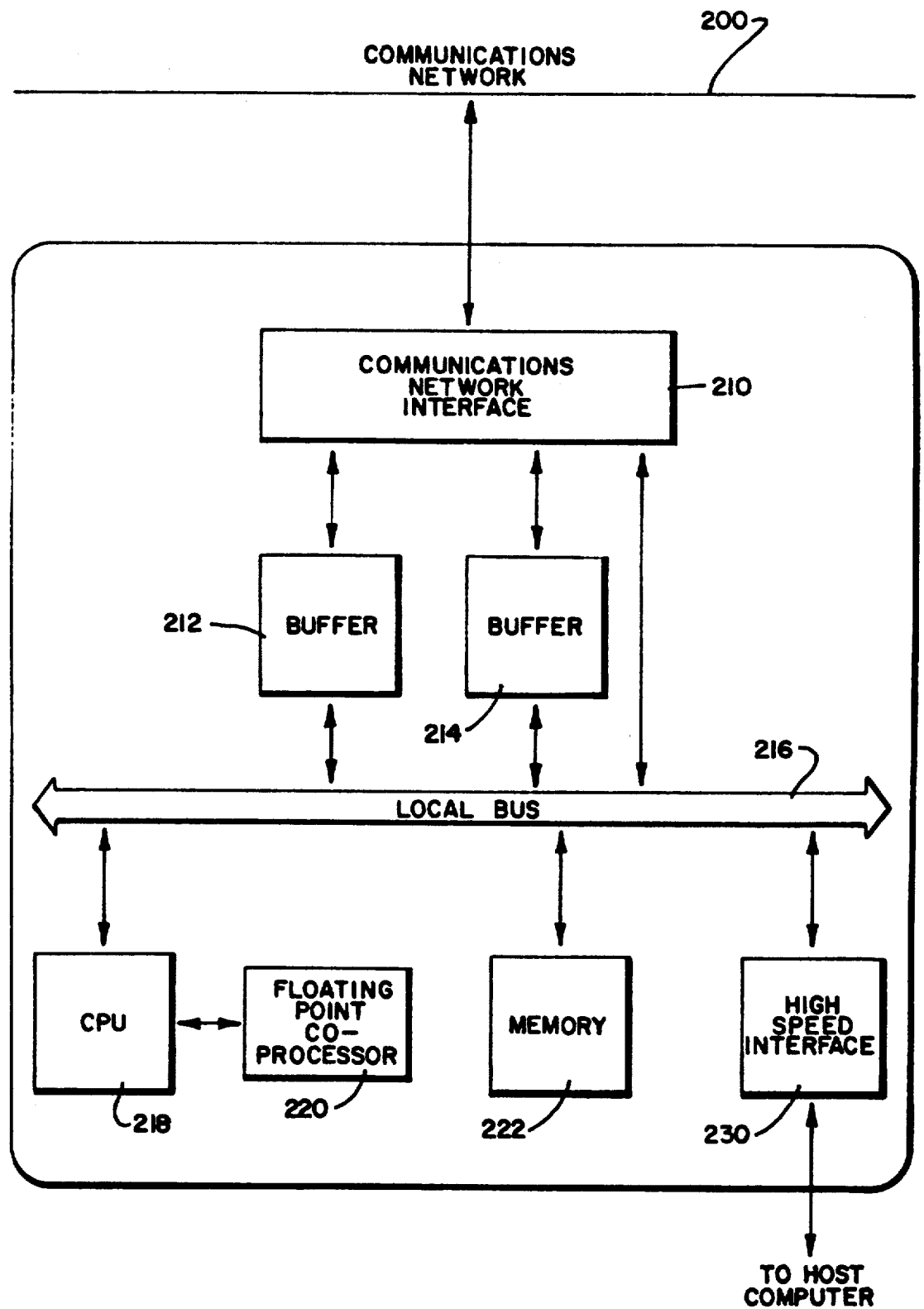

Referring now to FIGS. 23, 24 and 25 there is shown, in block diagram form, a system for parallel processing of topology directed subdivision using the enhanced subdivision procedure according to the present invention. In FIG. 23 there is shown the general system structure of the architecture. A communications network 200 is provided and has connected to it a master process or 206 and plurality of slave processors 208. The interconnection topology of the communications network can be varied. It is only necessary that the structure provide for communications between the processors such as may be provided by a VME bus.

The master and slave processors are shown in more detail in FIGS. 24 and 25. Each include a communications network interface, a pair of buffers 212:214 and 213:215, a CPU 218 having a floating point coprocessor 220 and a memory 222. Master processor 206 further includes a high speed interface 230 for connecting the processor to a host computer.

Generally, the system allows that a pair of surfaces are deposited from the host computer into the master processor which controls the system in order to perform subdivision operations on the surfaces in a parallel fashion. Once processed, the results are read back by the host computer.

Preferably, the format for data exchange between the processors comprises a datum having four fields. One field is status, which can take three values: U-unprocessed; T-transversal intersection; and X-unclassified intersection topology. The second field is the description of surface A. The third field is the description of surface B. The fourth field holds a flatness tolerance parameter.

In operation, a pair of surfaces are assembled into a datum by the host computer and the status of the datum set to "U". The datum is then deposited in the buffer 212 of the master processor 206. So long as buffer 212 contains a datum it seeks a slave processor in which to deposit it. When a slave processor is available the datum is deposited from master buffer 212 to slave buffer 213, which is one-datum deep.

Upon receipt of a new datum the slave processor 208 performs the following algorithm. First, a mutual point exclusion test is performed on the surfaces A and B. If the intersection is empty, slave processor 208 clears its buffer 213, writes a null value in buffer 215 and signals the master processor 206 it is done. If there is an intersection the processor performs a check for transversality as outlined before. If the intersection is transversal, the processor modifies the datum that was read from buffer 213 in the following way. First, the processor sets the datum status field to "T", and then places the datum in the output buffer 215 and signals the master processor that it is done.

If the transversality check fails, flatness is checked, using the specified flatness criteria. If flat enough, the processor modifies the datum that was read from buffer 213 in the following way. First, "X" is written in the status field, the datum placed in the output buffer 215 and the master processor signaled. If not flat enough, the surfaces are subdivided to form a plurality of surface pairs $(A_i, B_j)$, each of which are then assembled into a datum. The datum field for these datum is set to "U" and the tolerance set to the same tolerance set for the subdivided surfaces. All these datum are placed in the output buffer 215. The input buffer is then cleared.

Next, the master processor, upon being signaled by the slave, reads the output buffer. The master processor deposits all datum with status tags "U" into buffer 212 and all other datum (status tags "T" or "X") into the second buffer 214.

Accordingly, the master processor continues the process of distributing datum to the slaves until no datum exists with the status tag "U" in the system. At this point the host computer is signaled and the datum having "T" or "X" status tags, found in buffer 214, are returned to the host processor via the high speed interface.

Thus, it can be seen that topology directed subdivision may be performed in a high-speed parallel fashion by the system of the present invention.

Although the invention has been described above in its preferred form it will be understood that many modifications and changes may be made thereto without departing from the spirit and scope of the invention as set forth in the claim appended hereto.

We claim:

1. A solid-modeling system including means for performing recursive subdivision, comprising:

storage means;

master processor means;

a plurality of slave processor means;

means for connecting said master processor means and said slave processor means;

said system operational to identify intersections between the surfaces of a pair of solid models A and B represented by digital data surface descriptions stored in said storage means, said digital data surface descriptions produced by computer-aided design, said models representing, for example, articles of manufacture, machine parts or the path described by the movement thereof through space, each said surface description of each said model subdivided into a plurality of surface patches S each represented by a corresponding digital data surface patch description stored in a first pool of surface patch description pairs in said storage means, each said pair including one surface patch description from each of said models A and B, said system operational for determining by recursive subdivision which said surface patch description pairs in said first pool are transversal to produce a second pool of surface patch description pairs each known to be transversal, said system further determining when each of said pair of surface patch descriptions in said first pool have been subdivided to a limit specified by a predetermined criterion to produce a third pool of surface patch description pairs wherein both surface patch descriptions of said pair are known to meet said predetermined criterion;

said master processor means including means for obtaining from said first pool, a pair of digital data patch descriptions representing, respectively, a pair of surface patches $S_A$ and $S_B$ of said models A and B, and for passing said pair to one of said slave processor means;

each said slave processor means including means for:

(a) operating on said patch descriptions received from said master processor means to perform a mutual point exclusion test for said surface patches $S_A$ and $S_B$ and if no mutual points exist terminating further intersection identifying processing on said pair and signaling said master processor means that no mutual points exist for said pair;

(b) operating on said received patch descriptions to determine if said pair of surface patches $S_A$ and $S_B$ are transversal, provided mutual points exist for said pair, and if transversal signaling said master processor means said pair is transversal, said master processor means including means for retrieving said pair and storing it in said second pool;

(c) operating on said retrieved pair of patch descriptions to test each of said received surface patches $S_A$ and $S_B$ against a predetermined criterion, provided said pair is not transversal and mutual points exist, and if said criterion is met for both said surface patches signaling said master processor means that said pair has met said criterion whereby said pair can be classified in said third pool and the intersection set of said pair can be approximated and further subdivision of said surface patches $S_A$ and $S_B$ can be terminated, said means for retrieving said pair and storing it in said third pool; and (d) operating on said received patch descriptions to subdivide one or both of said surface patches $S_A$ and $S_B$ if they do not meet said predetermined criterion, said patch or patches subdivided into a further plurality of patches to create a plurality of new surface patch pairs representing new patch descriptions, and signaling said master processor to retrieve said descriptions representing said new pairs, said means for retrieving said new pairs and storing them in said first pool for further processing.

* * * * *